US 8,060,428 B1
Nov. 15, 2011

(12) United States Patent
Abrahamson

(54) SYSTEM AND METHOD FOR MANAGING TAX-DEFERRED RETIREMENT ACCOUNTS

(75) Inventor: Darwin K. Abrahamson, Portland, OR (US)

(73) Assignee: Invest N Retire, LLC, Portland, OR (US)

( * ) Notice: Subject to any disclaimer, the term of this patent is extended or adjusted under 35 U.S.C. 154(b) by 553 days.

(21) Appl. No.: 12/021,833

(22) Filed: Jan. 29, 2008

Related U.S. Application Data

(63) Continuation of application No. 10/973,483, filed on Oct. 26, 2004.

(51) Int. Cl.
*G06Q 40/00* (2006.01)
(52) U.S. Cl. .......................... 705/36 R; 705/37
(58) Field of Classification Search ............... None
See application file for complete search history.

(56) References Cited

U.S. PATENT DOCUMENTS

| | | |
|---|---|---|
| 4,953,085 A | 8/1990 | Atkins |
| 5,418,888 A * | 5/1995 | Alden .......................... 706/48 |
| 5,517,406 A | 5/1996 | Harris et al. |
| 5,812,987 A | 9/1998 | Luskin et al. |
| 5,819,230 A | 10/1998 | Christie et al. |
| 5,819,238 A | 10/1998 | Fernholz |
| 5,852,811 A | 12/1998 | Atkins |
| 5,864,828 A | 1/1999 | Atkins |
| 5,875,437 A | 2/1999 | Atkins |
| 5,884,285 A | 3/1999 | Atkins |
| 5,911,135 A | 6/1999 | Atkins |
| 5,911,136 A | 6/1999 | Atkins |
| 5,918,218 A | 6/1999 | Harris et al. |
| 5,978,778 A | 11/1999 | O'Shaughnessy |
| 5,991,744 A | 11/1999 | DiCresce |
| 6,012,043 A | 1/2000 | Albright et al. |
| 6,012,044 A | 1/2000 | Maggioncalda et al. |
| 6,018,722 A | 1/2000 | Ray et al. |
| 6,021,397 A | 2/2000 | Jones et al. |
| 6,041,313 A | 3/2000 | Gilbert et al. |
| 6,154,732 A * | 11/2000 | Tarbox ........................ 705/36 R |
| 6,219,650 B1 | 4/2001 | Friend et al. |
| 6,253,192 B1 | 6/2001 | Corlett et al. |
| 6,275,814 B1 | 8/2001 | Giansante et al. |

(Continued)

FOREIGN PATENT DOCUMENTS

WO 9722075 A1 6/1997

OTHER PUBLICATIONS

Mason, Todd, His visible fees are tricky to market, The Philadelphia Inquirer, May 2004.*

(Continued)

*Primary Examiner* — Rajesh Khattar
*Assistant Examiner* — Carol See
(74) *Attorney, Agent, or Firm* — Cox Smith Matthews Incorporated

(57) ABSTRACT

A system and method of managing tax-deferred retirement accounts may allow a plurality of participants to invest in a portfolio having a plurality of exchange traded funds (ETFs) according to an asset allocation model. The system and method may use at least one regular contribution to selectively buy at least one underweighted exchange traded fund to cause a participant's portfolio to more closely conform to the asset allocation model. The system and method may allow a plurality of participants to conduct calculations of estimated retirement savings based on a plurality of parameters.

30 Claims, 14 Drawing Sheets

U.S. PATENT DOCUMENTS

| | | |
|---|---|---|
| 6,321,212 B1 | 11/2001 | Lange |
| 6,336,102 B1 | 1/2002 | Luskin et al. |
| 6,338,047 B1 | 1/2002 | Wallman |
| 6,360,210 B1 | 3/2002 | Wallman |
| 6,393,409 B2 | 5/2002 | Young et al. |
| 6,584,451 B1 | 6/2003 | Shoham et al. |
| 6,601,044 B1 | 7/2003 | Wallman |
| 6,684,190 B1 | 1/2004 | Powers et al. |
| 7,050,998 B1 | 5/2006 | Kale et al. |
| 7,062,458 B2 | 6/2006 | Maggioncalda et al. |
| 7,117,176 B2 | 10/2006 | Wallman |
| 7,149,713 B2 | 12/2006 | Bove et al. |
| 7,174,313 B1 | 2/2007 | Martinez |
| 7,552,082 B2* | 6/2009 | Wallman .................. 705/37 |
| 2001/0034684 A1 | 10/2001 | Cushing et al. |
| 2001/0037276 A1 | 11/2001 | Kelly et al. |
| 2002/0002521 A1* | 1/2002 | Shearer et al. ............ 705/36 |
| 2002/0022982 A1 | 2/2002 | Cooperstone et al. |
| 2002/0035527 A1* | 3/2002 | Corrin ...................... 705/35 |
| 2002/0059127 A1 | 5/2002 | Brown et al. |
| 2002/0062271 A1 | 5/2002 | Breuninger |
| 2002/0091604 A1 | 7/2002 | Loeper |
| 2002/0099640 A1 | 7/2002 | Lange |
| 2002/0103852 A1 | 8/2002 | Pushka |
| 2002/0128947 A1 | 9/2002 | Sauter et al. |
| 2002/0138299 A1 | 9/2002 | Nations |
| 2002/0138383 A1 | 9/2002 | Rhee |
| 2002/0161682 A1 | 10/2002 | Ewing et al. |
| 2002/0169701 A1 | 11/2002 | Tarbox et al. |
| 2002/0174045 A1 | 11/2002 | Arena et al. |
| 2002/0174047 A1 | 11/2002 | Fernholz |
| 2002/0188536 A1 | 12/2002 | Milosavljevic et al. |
| 2002/0188540 A1 | 12/2002 | Fay et al. |
| 2002/0194098 A1 | 12/2002 | Stiff et al. |
| 2002/0198801 A1 | 12/2002 | Dixon et al. |
| 2003/0009403 A1 | 1/2003 | Sapp |
| 2003/0009406 A1* | 1/2003 | Ross ........................ 705/36 |
| 2003/0018557 A1 | 1/2003 | Gilbert et al. |
| 2003/0023544 A1 | 1/2003 | Chodes |
| 2003/0028466 A1 | 2/2003 | Jenson et al. |
| 2003/0033191 A1 | 2/2003 | Davies et al. |
| 2003/0093303 A1 | 5/2003 | Pooler |
| 2003/0093342 A1 | 5/2003 | Hillman et al. |
| 2003/0093353 A1 | 5/2003 | Ward et al. |
| 2003/0105692 A1 | 6/2003 | Gilbert et al. |
| 2003/0105697 A1 | 6/2003 | Griffin et al. |
| 2003/0120508 A1 | 6/2003 | Kizor et al. |
| 2003/0167220 A1 | 9/2003 | Schoen et al. |
| 2003/0172018 A1 | 9/2003 | Chen et al. |
| 2003/0177084 A1 | 9/2003 | Cassani et al. |
| 2003/0195827 A1 | 10/2003 | Lichtig, III |
| 2003/0208432 A1 | 11/2003 | Wallman |
| 2003/0212622 A1 | 11/2003 | Wallman |
| 2003/0229561 A1 | 12/2003 | Wallman |
| 2004/0024677 A1 | 2/2004 | Wallman |
| 2004/0024678 A1 | 2/2004 | Wallman |
| 2004/0024679 A1 | 2/2004 | Wallman |
| 2004/0039667 A1 | 2/2004 | Winklevoss et al. |
| 2004/0039675 A1 | 2/2004 | Wallman |
| 2004/0049448 A1 | 3/2004 | Glickman |
| 2004/0078244 A1 | 4/2004 | Katcher |
| 2004/0088236 A1 | 5/2004 | Manning |
| 2004/0117286 A1 | 6/2004 | Charnley, Jr. |
| 2004/0158517 A1 | 8/2004 | Mahaney et al. |
| 2004/0199447 A1 | 10/2004 | Treynor |
| 2004/0225548 A1 | 11/2004 | Aldrich et al. |
| 2005/0010516 A1 | 1/2005 | Ivanov et al. |
| 2005/0049952 A1* | 3/2005 | Carter ....................... 705/36 |
| 2005/0065873 A1 | 3/2005 | Hendrickson et al. |
| 2005/0075971 A1 | 4/2005 | Delaney |
| 2005/0154658 A1* | 7/2005 | Bove et al. ............... 705/35 |
| 2005/0154662 A1* | 7/2005 | Langenwalter ........... 705/35 |
| 2005/0177509 A1 | 8/2005 | Mahaney et al. |
| 2006/0129439 A1 | 6/2006 | Arlt et al. |
| 2006/0184449 A1 | 8/2006 | Eder |
| 2006/0190378 A1 | 8/2006 | Szydlo |
| 2007/0083454 A1 | 4/2007 | Anderson et al. |
| 2007/0083455 A1 | 4/2007 | Bove et al. |
| 2010/0138332 A1* | 6/2010 | Seaman et al. ........... 705/35 |

OTHER PUBLICATIONS

Firms produce ETF products to meet heavy demand, Defined Contribution News, New York: Oct 18, 2004.*

Fidelity Investments, "Why Rebalance to Your Desired Asset Allocation?" Retirement Plan- Guidelines for Rebalancing your Portfolio, http://personal.fidelity.com/planning/retirement/content/how_to_rebalance.shtml (printed Jan. 10, 2008) (2 pages).

U.S. Securities and Exchange Commission, "Beginners' Guide to Asset Allocation, Diversification, and Rebalancing" http://www.sec.gov/investor/pubs/assetallocation.htm (printed Aug. 7, 2007) (7 pages).

TD Ameritrade, "Portfolio Investing: Get a diversified portfolio tailored to your goal." Investment Portfolio—TD Ameritrade—Goal based portfolio diversification, http://www.tdameritrade.com/planningretirement/portfolioguidance/portfolioinvesting.html (printed Aug. 7, 2007) (2 pages).

Nofsinger, John R., "Continuing Process," Investment Blunders of the Rich and Famous . . . and What you can Learn from Them, Chapter 15, preview only: http://safari.oreilly.com/0130668419/pref01 (printed on Jan. 10, 2008) (5 pages).

Barra, "Checking portfolio efficiency with implied alpha" www.barra.com/support/library/implied_alphas.pdf (Last modified Mar. 11, 2005) (6 pages).

Eaton Vance Corp., New Release, "Eaton Vance Announces Launch of the Supplemental Retirement Account: A Tax-Advantaged Non-Qualified Retirement Savings Program" (Nov. 15, 2006) (3 pages).

Citi Smith Barney, "Revenue Sharing Fund Families, Expense Reimbursements and Administrative Service Fees," www.smithbarney.com/products_services/mutual_funds/investor_information/revenueshare.html (Last visited Mar. 20, 2008) (4 pages).

Bombardieri, Debrah, "401(K)S Getting ETF Options", Nov. 15, 2004 (1 page).

Hamilton, et al., Fees Eat Away at Employees' 401(K) Nest Eggs, latimes.com, Apr. 23, 2006 (10 pages).

Robertson, Jeff, Lower Costs or Hidden Problems: The Legal Concerns for ETFS in 401K Plans, Bullivant Houser Bailey PC, Jun. 3, 2005 (2 pages).

Hoffman, David, ETF Giant Launches 401(K) Plan Invasion, Jun. 11, 2007 (2 pages).

Hoffman, David, Wisdomtree to Launch 401(K) Platform for ETFS, Apr. 16, 2007 (2 pages).

Benefitstreet Launches Direct Exchange Traded Fund 401(K) Platform, Business Wire, May 29, 2007 (2 pages).

Carrel, Lawrence, Barclays Boosts Inclusion of ETFS in 401(K)S, www.thestreet.com/pf/funds/etftuesday/10359257.html; May 29, 2007 (2 pages).

401(K)s on Benefitstreet, IndexUniverse.com, Jun. 4, 2007 (1 page).

Bell, Heather, 401(K)S and ETFS, IndexUniverse.com, Apr. 12, 2007 (2 pages).

Benefitstreet Clears Its Throat, Barclays Hedges Its DC BET, 401kWire.com, Dec. 18, 2007 (2 pages).

Benefitsteeet Freezes Sales of Its ETF 401K Platform, 401kWire.com, Dec. 10, 2007 (2 pages).

Benefitstreet Gets a Little Shorter, 401KWire.com, Nov. 14, 2007 (1 page).

Benefitstreet Rolls Out ETF 401K Platform, 401KWire.com, May 29, 2007 (2 pages).

Polyak, Liana, Changes in 401(K) World May Open the Door for ETFS, Apr. 9, 2007 (3 pages).

Mitchem, Kristi 401KWire.com, Dec. 27, 2007 (2 pages).

Salisbury, Ian, Update: Getting Personal: in 401(K)S, ETFS Lose Some Luster, A Dow Jones Newswires Column, Jun. 4, 2007 (3 pages).

U.S. Appl. No. 10/973,483; entitled: System and Method for Managing Tax-Deferred Retirement Accounts, filed Oct. 26, 2004; Inventor: Darwin K. Abrahamson.

Fulcrum Financial Inquiry LLP, Form ADV Part II—p. 1 and Schedule F, Uniform Application for Investment Adviser Registration, Nov. 20, 2003, (5 pages).

Fulcrum Financial Inquiry LLP, Managed Mutual Funds Consistently Underperform Their Benchmark Indexes, According to Study by Fulcrum Financial, Nov. 1, 2004, (2 pages).

Oster, et al., Big Fees Take Toll on 401(K) Plans of Small Employers, The Wall Street Journal Online, Oct. 21, 2004, p. D-1 (4 pages).

Oster, Christopher, ETFS Catching on With 401(K) Plans, The Wall Street Journal, Jul. 14, 2004, pp. 1-2 (2 pages).

Zapson, Marsha, 401(K) Plans Add ETFS, Exchange-Traded Funds Report, Issue No. 47, Oct. 2004, pp. 1, 7, and 10 (3 pages).

Plansponsor.com; Table of Contents: Bells & Whistles, Oct. 2004, pp. 1-3 (3 pages).

Schneyer, Fred, K Plan Provider Adds ETFS, Plansponsor.com, Sep. 2, 2004 (1 page).

Keefe, John, Asset Mix: Role "PLAY", NewsDash from Plansponsor. com, Jun. 1, 2004, pp. 1-3 (3 pages).

Myers, Randy, The Bottom Line: Needful Things?, PlanSponsor Magazine, Feb. 2004, pp. 1-4 (4 pages).

Reish, Fred, Just Out of Reish: Affirmative Actions, PlanSponsor Magazine, Nov. 2002 (2 pages).

Plansponsor.Com, Special Report: Exchange-Traded Funds: Different Strikes, Apr. 2007 (2 pages).

Giegerich, Andy, Evolution of the 401(K), The Business Journal, Sep. 17, 2004, pp. 1-3, vol. 21, No. 29, Portland, Oregon (3 pages).

ETFguide.Com, Nasdaq ETFS to Be Offered in 401 (K) Plan, Sep. 15, 2004 (1 page).

ETFguide.Com; Undoing the 401(K) Monopoly: An Interview With Darwin Abrahamson of Invest N Retire, LLC, Jun. 30, 2004 (2 pages).

Bucci, Peter, Nasdaq Cracks Open 401(K) Plans to ETFS, Ignites. com, Sep. 2004 (1 page).

Checkler, Joseph, Nasdaq ETFS Offered on 401(K) Platform, Financial-Planning.com, Sep. 7, 2004 (1 page).

Katzeff, Paul, ETFS Trying to Expand in 401(K) Plans, Investor's Business Daily, Sep. 3, 2004, pp. 1-2 (2 pages).

Carrel, Lawrence, 401(K) Plans May Offer ETFS, SmartMoney.com, Sep. 3, 2004 (1 page).

Spence, John, Nasdaq ETFS Join 401(K) Provider Lineup, CBS Marketwatch.com, Sep. 2, 2004 (1 page).

Spence, John, ETFs May Be Coming to Your 401(K), Marketwatch. com, Jan. 15, 2007 (2 pages).

Coleman, Murray, Leaving 401(K) Fees on the Cutting Floor, Marketwatch.com, May 29, 2007 (2 pages).

Lee, Wayne, Nasdaq ETFS Added to Invest n Retire's 401(K) Plans, Nasdaq and Invest Retire, Sep. 2, 2004 (2 pages).

Miller, Rick, ETFS on the Way for 401(K)s? InvestmentNews, Aug. 23, 2004 (2 pages).

Southall, Brooke, Efforts Fail to Bring Cheap 401(K)s to Small Businesses, InvestmentNews, Feb. 9, 2004, pp. 1-2 (2 pages).

Southall, Brooke, Omnibus Plan Makes Ishares Viable for 401(K)s, InvestmentNews, Sep. 8, 2003, pp. 1-2 (2 pages).

Hoffman, David, Barclays Intros 401(K) Plans With ETFs, InvestmentNews, May 29, 2007 (2 pages).

Demby, Elayne Robertson, Exchange-Traded Funds Enter 401(K) Investment Arena, Employee Benefit Adviser, Jul. 2004, pp. 1-3 (3 pages).

Mason, Todd, His Visible Fees are Tricky to Market, The Philadelphia Inquirer, philly.com, May 2004, pp. 1-2 (2 pages).

The 12th Annual Defined Contribution/401(k) Conference, Staying Abreast of Changing DC/401(K) Trends, Issues, Legislation, and Best Practices, Feb. 8-10, 2004, Orlando, Florida (6 pages).

Blank, Herb, Addressing the Defined Contribution Plan Dilemma, Pensions & Investments, The International Newspaper of Money Management, Nov. 1, 2003, pp. 1-4 (4 pages).

Combs, et al. The Automatic Revolution: for 401(K) Plans, New Rules Provide for Better Investing by Default, Pensions & Investments, The International Newspaper of Money Management, Nov. 12, 2007 (2 pages).

French, Kristen, INR Offers First 401(K) ETF Option With Barclays Ishares, Financial PLANNING Interactive, The Thomson Corporation, Oct. 2, 2003, pp. 1-2 (2 pages).

Blank, Herb, Flexibility, Liquidity, Transparency and Low Costs Exchange Traded Funds, Sep. 2003, pp. 1-4, 6, 8,10-12, 14, 16-17, 19-20, P & I Custom Publishing, New York, NY (16 pages).

Abrahamson, Darwin, Ishares Included as an Investment Option in the 401(K) Solution, Invest N Retire, LLC Press Release, Sep. 4, 2003 (1 page).

Piazza, Jack, Sensible Investment Strategies, "Rebalancing Your Portfolio" Rebalancing Your Portfolio—the key to controlling risk, http://www.seninvest.com/article9.htm (printed Aug. 7, 2007) (3 pages).

Office Action in U.S. Appl. No. 10/973,483, dated Dec. 27, 2007 (18 pages).

Office Action in U.S. Appl. No. 10/973,483, dated Oct. 14, 2008 (15 pages).

Office Action in U.S. Appl. No. 10/973,483, dated Apr. 14, 2008 (17 pages).

Office Action in U.S. Appl. No. 10/973,483, dated Mar. 31, 2010 (19 pages).

* cited by examiner

Data Input Page

Retirement Calculator

Experts predict that you will need approximately 65 to 85 percent of your current income to maintain your present lifestyle in retirement. Use our retirement calculator to assist you in determining how much money you need to accumulate by the time you reach retirement age.

| | |
|---|---:|
| Age | 46 |
| Retirement age - default age 65 | 65 |
| Estimated annual inflation - default 3% | 3 |
| Target annual rate of return % - default is current model | 11.92 |
| Annual Salary | 123,120 |
| Estimated annual increase in salary - default 3% | 3 |
| Percent of current salary desired at retirement - default 75% | 75 |
| Employee contribution % - default is current election | 8.00 |
| Retirement savings account balance | 42,757 |
| Employer matching % is | 25 |
| of employee's first % | 8 |
| Other retirement savings | |
| Tax-deferred e.g. IRA | 50,000 |
| Taxable e.g. money market | 0 |

[ Next ]

ROR: Represents the rate of return earned on investments. Returns may be positive or negative.

Since a person's retirement needs are constantly changing, you should recalculate your retirement funding goal on an annual basis. Factors that can impact your retirement income needs include: (i) as you age your life expectancy increases which means you will need additional savings in order to pay your living expenses throughout your lifetime, (ii) your investments outside of your retirement savings may have increased (inheritance) or decreased (financial loss) which may affect your overall financial health, (iii) your personal health can affect your expected retirement date (illness) and income needs, or (iv) you may decide to continue working and retire later than expected.

Disclaimer: This program does not advocate any specific investment strategy. Returns are not guaranteed. Inflation and returns will fluctuate over time. The calculations do not take into consideration social security income or the effect of taxes on withdrawals. The results are only an estimate and may not be an exact analysis of your situation. For specific questions consult your tax, legal, and financial advisor.

FIG. 3

RESULTS

Savings Earmarked for Retirement

| | |
|---|---:|
| Retirement savings | $42,757 |
| Additional tax-deferred savings | $50,000 |
| Additional taxable savings | $0 |
| Future value of retirement savings | $1,727,470 |
| Estimated retirement fund need | $3,056,629 |
| Estimated shortage at retirement | $1,329,159 |
| Additional amount you need to save annually | $21,134 |
| Additional percent of annual income needed | 17% |
| Asset allocation model based on target ROR | Moderately Aggressive |
| Calculator identified model which targets the rate of return you indicated you desire to earn. | View Model |

Summary

Based on the information you provided, the results indicate that you will have a shortage at retirement. Options: target a higher rate of return, increase your contribution, re-evaluate your income need at retirement, or retire later.

Assumptions

| | |
|---|---:|
| Age | 46 |
| Retirement age | 65 |
| Life expectancy using IRS single life table | 84 |
| Years of investing | 19 |
| Years of payout | 19 |
| Annual salary | $123,120 |
| Employee contribution | 8.00% |
| Target annual rate of return | 11.92% |
| Estimated annual inflation | 3% |
| Estminated annual salary increase | 3% |
| Marginal tax rate | 25% |
| Percent of current salary desired at retirement | 75% |
| Projected annual income need | $157,203 |

[ Previous ]  [ View model based on target ROR ]

ROR: Represents the rate of return earned on investments. Returns may be positive or negative.

FIG. 4

Tax Advantage Calculator

| Tax Advantage Calculator | | |
|---|---|---|
| Annual income | 100,000 | |
| Tax bracket | 28% | |
| Taget rate of return (ROR) | 7 | % default 7% |
| Employee contribution | 3 | % default current election |

Employer matching is 50% of Employee's first 5%

| | Taxable Savings | Retirement Savings | Retirement Dollar Gain | Retirement Percent Gain |
|---|---|---|---|---|
| Employee contribution | $ 3,000 | $ 3,000 | | |
| Employer matching | | $ 1,500 | | |
| Tax deduction | $ (840) | 0 | | |
| Annual savings | $ 2,160 | $ 4,500 | $ 2,340 | 108% |
| Future value (FV) | | | | |
| FV 5 years | $ 12,254 | $ 26,847 | $ 14,594 | 119% |
| FV 10 years | $ 28,011 | $ 64,907 | $ 36,896 | 132% |
| FV 15 years | $ 48,273 | $ 118,861 | $ 70,588 | 146% |
| FV 20 years | $ 74,329 | $ 195,347 | $ 121,019 | 163% |
| FV 25 years | $ 107,834 | $ 303,777 | $ 195,943 | 182% |
| FV in xx years  0 | 0 | 0 | 0 | N/A% |

FIG. 5

Moderate Asset Allocation Model

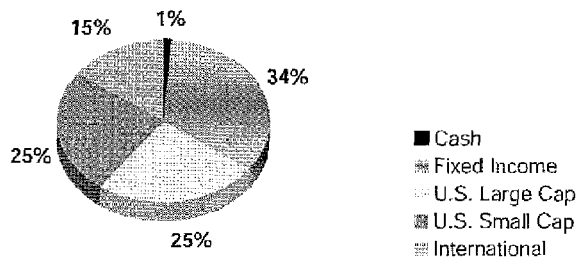

- Cash
- Fixed Income
- U.S. Large Cap
- U.S. Small Cap
- International

| Moderate Asset Allocation | Percent Asset Class | Annual ROR | 1973-2006 Historical ROR | Lowest 1 Yr ROR | Highest 1 Yr ROR | Number down yrs |
|---|---|---|---|---|---|---|
| Cash | 1% | 6.21% | | | | |
| Fixed Income | 34% | 8.42% | | | | |
| U.S. Large Cap | 25% | 11.13% | | | | |
| U.S. Small Cap | 25% | 14.72% | | | | |
| International | 15% | 12.78% | | | | |
| Total Return | 100% | | 11.78% | -13.07% | 32.68% | 7 |

| Asset class and fund | Percent Allocation | Fees |
|---|---|---|
| Cash | 1% | 0.00% |
| Cash | 1% | |
| Fixed Income | 34% | |
| Vanguard Inter-Term Bond ETF | 20% | 0.02% |
| Vanguard Short-Term Bond ETF | 14% | 0.02% |
| U.S. Large Cap | 25% | |
| Vanguard Value ETF | 15% | 0.02% |
| Vanguard Large Cap ETF | 10% | 0.01% |
| U.S. Small Cap | 25% | |
| Vanguard Small Cap ETF | 10% | 0.01% |
| Vanguard Small Cap Value ETF | 5% | 0.01% |
| Vanguard REIT ETF | 10% | 0.01% |
| International | 15% | |
| Vanguard European ETF | 5% | 0.01% |
| Vanguard Pacific ETF | 5% | 0.01% |
| Vanguard Emerging Mkts ETF | 5% | 0.02% |
| Total fees | | 0.14% |

Standard Deviation 12%

Fees are calculated on a weighted average for total fees.
Results are based on historical rate of return and are not a guarantee of investment results.
Data is based on sources deemed realiable. Source: Each investment provider.

FIG. 6

SYSTEM AND METHOD FOR MANAGING TAX-DEFERRED RETIREMENT ACCOUNTS

CROSS REFERENCE TO RELATED APPLICATIONS

This application is a continuation-in-part of U.S. patent application Ser. No. 10/973,483, filed on Oct. 26, 2004, the disclosure of which is incorporated herein by reference.

FIELD

This invention relates generally to management of tax-deferred retirement accounts, and more particularly to a system and method of managing tax-deferred retirement accounts that enables the participants to invest in exchange traded funds (ETFs) and to forecast and intelligently plan for their retirement savings needs.

BACKGROUND

Policy-makers and researchers have an acute interest in the growth of pension plans and their relationship in influencing work and retirement, saving and consumption, and well-being in old age. Analysts concerned about poverty and income sufficiency acknowledge that pensions play a key role in the well-being of the elderly. Traditional pension plans, such as defined benefit plans that promised each employee a certain amount of his or her salary at retirement, placed responsibility for retirement planning for each employee on the employer, making the employer a "fiduciary." However, over the past several years, there has been a shift from defined benefit plans to self-directed defined contribution plans, such as 401(k) plans. Consequently, with the proliferation of 401(k) plans, responsibility for retirement planning has shifted away from the employer and now rests squarely on the shoulders of each individual plan participant. By and large, the plan participants are not well equipped to handle such responsibility.

In 1995, researcher John Shoven confirmed that pension assets grew faster than total wealth in the United States during the 1980's, leading Shoven to conclude that "pensions are how America saves." At the same time that pension wealth has grown, there has been a revolution in the pension industry, as defined contribution plans, and 401(k) plans in particular, have become the pension plans of choice. Defined contribution plans increased from 13 to 30 percent between 1975 and 1985 and then to 42 percent in 1992. By 1997, defined contribution plans rose to 53 percent. See *Defined Contribution Plan Dominance Grows Across Sectors* . . . , special report by Kelly Olsen and Jack Van Derhei, Employee Benefit Research Institute, October 1997, Special Report 190, Washington, D.C. By projecting trends on pension contributions, the U.S. Department of Labor in 1997 concluded that more money is going into private 401(k) plans than all other private pension plans combined. Most of the contributions are coming directly from workers.

At the same time, there was a similar shift in the responsibility for managing assets in employer-sponsored retirement plans. Previously, the Chief Investment Officers and Chief Financial Officers of employer companies acted not only as the trustee for the plan but also as the investment officer for the plan. However, with the shift to defined contribution plans, the overwhelming majority of workers participating in 401(k) plans are required to manage the investment of their retirement savings directly. In this brave new world, workers not only have to determine when to start saving for retirement and how much to contribute to their retirement accounts, they also must decide how to allocate their retirement funds across various types of assets.

Unfortunately, as illustrated by a Watson Wyatt study, participant directed 401(k) plans are lagging behind institutional investors' returns in defined benefit plans by four percent (4%) annually. At first blush, a four percent (4%) difference may appear insignificant; however, the difference over a thirty-year period is staggering. For workers, a thirty-year period represents the average time horizon between mid-career and mid-retirement. Over a period of thirty years, $100,000 invested at ten percent (10%) will earn $1,744,940, while the same $100,000 invested at six percent (6%) will earn only $574,349. In this example, the missing four percent compounds to over one million missing dollars.

As reported by the Investment Company Institute (ICI), by the end of 2006 investors held $2.7 trillion in 401(k) plans and $8.4 billion in 403(b) and 457 plans. With the proliferation of participant-directed plans, more employees are directing the investment of their pension plan assets, despite the fact that most of them do not feel up to the task as evidenced by a number of surveys. The surveys reveal that most participants do not have a sufficient understanding of investment concepts and principles in order to make their own, well-informed investment decisions. For example, in a 1996 survey by Merrill Lynch, 53% of employees said that their employers do not provide sufficient investment related materials; 80% said that educational materials or assistance would help them make better decisions; and 66% said that estimating the amount needed to be saved for retirement was the least covered topic. Similarly, in a Watson Wyatt survey of 622 companies, 66% of the employees rated printed information as not effective, 58% said that their plan does not project future account balances, and 90% said that their employers were not effective in communication. Clearly, 401(k) participants do understand that they are not prepared to make basic investment decisions which are necessary in order for them to achieve their retirement goals. Faced with overwhelming doubt, participants often turn to coworkers, friends, and the anecdotal information they read in newspaper and magazine articles for guidance in making their investment decisions. In 1996, Dalbar Financial Services reported that 83% of the respondents expect their employers to provide them with "investment education." The September 1997 issue of *Pension and Investments* confirms this trend: "Participant demand for investment education and information grows . . . " Participants are requesting help from their employers. Unfortunately, today's typical 401(k) plan service provider simply directs a participant's attention to numerous mutual funds, focusing on "past performance" rather than concentrating on the retirement goal of each plan participant. The consequence of the "performance disease" is low returns, high costs, and inattention to the risks and rewards of asset allocation.

Currently 401(k) service providers have no real solution for helping participants meet their retirement goals. Firms such as Financial Engines, Clear Choice, and Plan Tools, who are third party Registered Investment Advisory firms, offer online investment advice through generic risk/reward scenarios after the participant completes a risk/reward questionnaire. Based on the results of the questionnaire indicating the participant's risk tolerance, a portfolio of funds is recommended. However, using this methodology, a portfolio is recommended which may not meet the actual retirement needs of the participant. Furthermore, in the case of Financial Engines, the recommended portfolio only illustrates the highest probability that the participant will achieve his or her retirement goal.

The services offered by such firms as Financial Engines, Clear Choice, and Plan Tools are additional services that are not required to manage and administer a 401(k) plan. Consequently, those firms add additional costs to each plan participant. Furthermore, those firms do not participate in the selection process for choosing appropriate investment vehicles for the plan. Consequently, those firms are not facilitating the plan sponsor or the participants in choosing appropriate investment options for the plan. This deficiency completely precludes their ability to recommend a well-structured asset allocation model.

Another alternative currently available to participants is to choose an asset allocation model based solely on the participant's target retirement date. This alternative is offered by several mutual fund companies and trust companies. Target-date investments, also known as target-date funds, lifestyle funds and lifecycle funds, are funds of funds created by mutual fund families and trust companies. Target-date investments are designed under the assumption that a participant's target date for retirement should automatically adjust the asset mix of the asset allocation model, regardless of current financial status or future income needs.

Participants usually are allowed to select one or more target-date funds based on their planned retirement date or using their current age. That is, as the participant moves closer to retirement age, the portfolio mix continues to increase in bonds and decrease in equities. According to a study conducted by Hewitt Associates, participants don't even understand the principle behind target-date funds and end up choosing several target-date funds for a portfolio mix. According to that study, most of the participants were not matching their risk profile with their age in order to choose a target-date fund. "Many participants who used lifestyle funds weren't choosing one lifestyle fund, but allocating to several lifestyle funds at once," said Lori Lucas, a defined contribution consultant with Hewitt Associates. "Clearly, lifestyle funds are not being used as the simple, straightforward investment solution they are intended to be."

Peter Lynch, former manager of the Fidelity Magellan Fund, disputes the theory that a person's age should dictate the person's investment portfolio. In his book, *Beating the Street*, Lynch stated that "this popular prescription, stocks for the young, bonds for the old, is . . . obsolete."

Target-date investments have proven to be an expensive investment choice since mutual fund families and trust companies add an additional management fee on top of the other management fees and costs of the underlying funds. Despite the fact that target-date funds are expensive, with investors typically paying two layers of fees: one for the target-date fund itself and another that is an asset-weighted average of the management fees of the underlying funds, target-date funds have soared in popularity. According to David Loeper, CEO of Financeware, "Target date funds 'are loaded with excessive fees.'" In 2000, there were only 23 target-date funds with a little over $8 billion in assets. In 2007, there are more than 205 target-date funds with total assets of over $160 billion with assets in target-date funds growing by 60% to 70% a year since 2002.

A white paper based on research by The Compass Institute LLC, a Chicago-based think tank, which was conducted over a 10-year period, illustrated that target date funds, yield far lower returns than other investment methods. The paper illustrated that investors who start in an up market can expect an annual average return of 8.8% if they are in the best-performing target-date fund and 6.9% in the worst-performing target-date fund, compared with 16.2% using an adaptive asset allocation strategy. The paper also illustrated that investors who start in a down market can expect an annual average return of 4% in the best-performing target-date fund and 2.9% in the worst-performing target-date fund, compared with 11.9% using adaptive allocation. According to Elliot N. Fineman, senior vice president of the Compass Institute, "We feel very strongly that target date is just the worst possible thing." The Compass Institute's white paper concluded that putting participants in target-date funds exposes investors to the higher risks over market cycles and assures their not having nearly enough money in retirement. Mr. Fineman explained that the reason target-date funds don't work in the long run is because in a down market, it is difficult for them to recover. "When the market recovers, they always have 20% to 30% lost money that they can't recover,"

Another major problem with current 401(k) plans involves the high investment costs and expenses which participants are paying for their mutual fund investment options. The 401k Provider Directory Averages Book "found that investment expenses account for upwards of 81% of total plan costs in smaller plans and 98% in larger plans." Seventy-one percent (71%) of all assets in defined contribution plans are mutual funds, which carry high management fees. See Brief of US Retirement Assets 2003, Investment Company Institute, June 2004. Unfortunately, high fees and expenses result in lower retirement income for plan participants.

Exchange traded funds (ETFs) have much lower fees and expenses than mutual funds. However, to date, ETFs have been available only through self-directed brokerage accounts or collective trusts. Unfortunately, the commission costs associated with trading ETFs through a self-directed brokerage account makes it prohibitive for 401(k) participants who invest in incremental amounts each pay period to invest in ETFs. Similarly, plan sponsors who may wish to offer ETFs to their plan participants through a collective trust are finding that the annual administrative costs, per collective trust, can be as high as 180 bps, which makes collective trusts prohibitive. Therefore, the costs associated with self-directed brokerage accounts and collective trusts negate any benefit participants might have enjoyed through those investment vehicles.

SUMMARY

It would be a significant advancement in the art to provide a system and method of managing tax-deferred retirement accounts that enable participants to realize the reduced costs of exchange traded funds, forecast and intelligently plan for their retirement savings needs, and rebalance their portfolio using regular contributions.

A system and method of managing tax-deferred retirement accounts may allow each participant to invest in a portfolio having a plurality of exchange traded funds (ETFs) according to an asset allocation model (AAM). The system and method may continuously self-align each participant's portfolio with each payroll contribution by analyzing each holding in the participant's AAM and determine if any holding is under-weighted or over-weighted according to the percent allocation for the model. To maintain self-alignment, the system may purchase more shares for any investment option that is under-weighted and fewer shares for any investment option that may be over-weighted.

The system and method may allow a plurality of participants to conduct calculations of estimated retirement savings based on a plurality of parameters and may identify an AAM which targets the rate of return a participant indicates the participant needs to earn in order to reach his or her retirement goal.

BRIEF DESCRIPTION OF THE DRAWINGS

FIG. 3 is a sample computer software screen layout showing a data input page of a retirement calculator in accordance with an embodiment of the present invention.

FIG. 4 is a sample computer software screen layout showing a results page of a retirement calculator in accordance with an embodiment of the present invention.

FIG. 5 is a sample computer software screen layout showing a 401(k) tax advantage calculator in accordance with an embodiment of the present invention.

FIG. 6 is a sample illustration of a moderate asset allocation model in accordance with an embodiment of the present invention.

DETAILED DESCRIPTION

As used herein, the following terms should be understood to have the indicated meanings:

When an item is introduced by "a" or "an," it should be understood to mean one or more of that item.

"Asset allocation model" means a set of one or more criteria for allocating funds among one or more asset classes.

"Comprises" means includes but is not limited to.

"Comprising" means including but not limited to.

"Computer processor" means any programmable machine capable of executing machine-readable instructions. A computer processor may include but is not limited to a general purpose computer, microprocessor, computer server, digital signal processor, or a combination thereof. A computer processor may comprise one or more processors, which may comprise part of a single machine or multiple machines.

"Computer software" means a list of instructions that may be executed by a computer to cause the computer to operate in a desired manner.

"Computer readable medium" means an article of manufacture having a capacity for storing one or more computer programs, one or more pieces of data, or a combination thereof. A computer readable medium may include but is not limited to a computer memory, hard disk, memory stick, magnetic tape, floppy disk, optical disk (such as a CD or DVD), zip drive, or combination thereof.

"Exchange traded fund" means a security that tracks an index, a commodity or a basket of assets like an index fund, but trades like a stock on an exchange, thus experiencing price changes throughout the day as it is bought and sold.

"Having" means including but not limited to.

"Participant" means an individual or entity that participates in an investment plan. A participant may include but is not limited to an employee participating in an employer's retirement program.

"Plurality" means two or more.

"Portfolio" means a group of one or more investments held, in whole or in part, by an individual or entity. A portfolio may include but is not limited to a tax-deferred retirement account.

"Rebalance" means to sell or buy one or more investments to adjust the relative percentage that two or more investments comprise within a portfolio as compared to the total monetary value of the portfolio such that the relative percentages of such investments substantially conform to an asset allocation model.

"Target-date investment" means an investment which automatically resets the asset mix in its portfolio based on an individual's age or according to a selected time frame, such as retirement date. A target-date investment may include but is not limited to a target-date fund.

"Tax-deferred retirement account" means an investment account for which tax on the growth of an investment therein is deferred for a period of time. A tax-deferred retirement account may include but is not limited to a 401(k) account.

Figure 1:
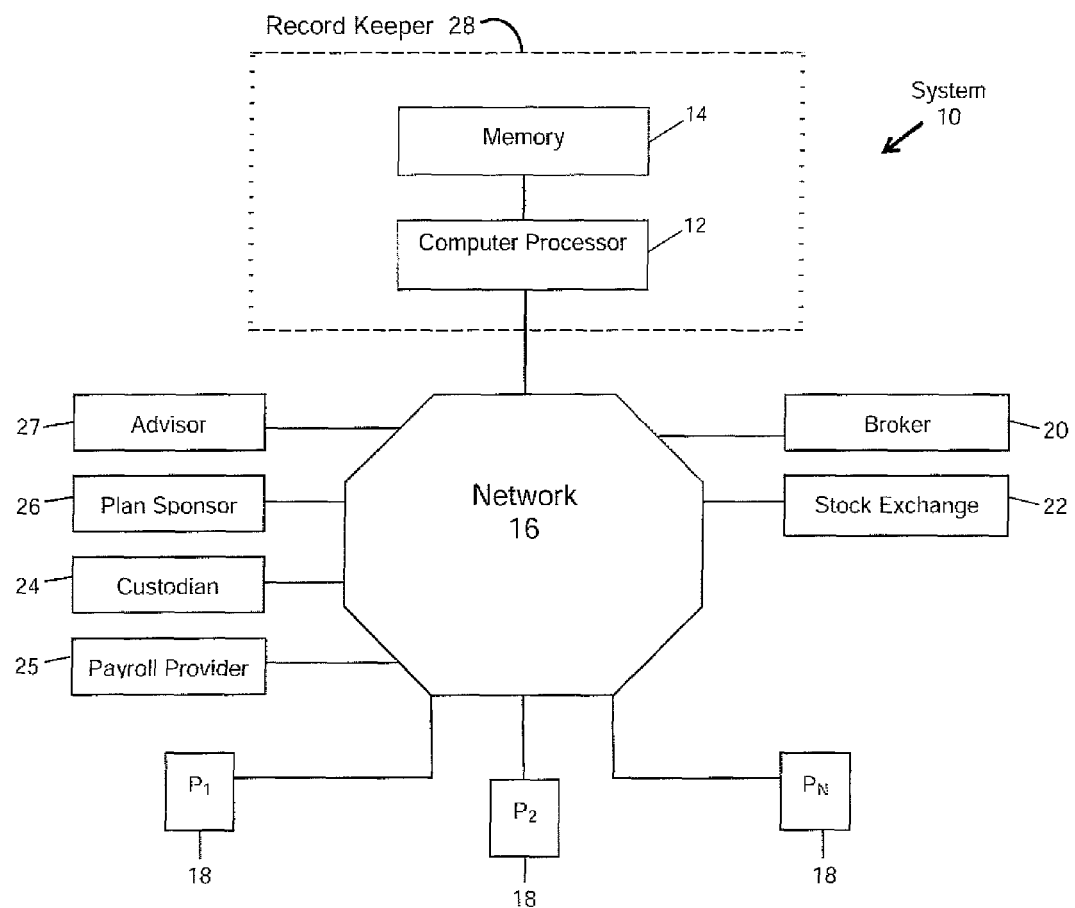
FIG. 1 is a schematic block diagram of a system for managing tax-deferred retirement accounts in accordance with various embodiments of the present invention.

Referring to FIG. 1, various embodiments of a system 10 for managing tax-deferred retirement accounts may comprise a computer processor 12 with an associated memory 14. In various embodiments, computer processor 12 may be connected via a network 16 to a plurality of other computer processors 18 that are respectively associated with a plurality of participants $P_1$ through $P_N$ in one or more tax-deferred retirement plans, such as 401(k), 403(b), 457, and 409A plans, for example. Network 16 may be any suitable network, such as the Internet. Of course, other suitable networks may be used. In various embodiments, a record keeper (RK) 28 may comprise a person or entity that may manage computer processor 12 to implement the method of various embodiments of the present invention. Computer processor 12 may be further connected via network 16 to a computer processor 20 associated with a securities broker, a processor 24 associated with a custodian of the plan assets, a processor 25 associated with a payroll provider, a processor 26 associated with a plan sponsor and a processor 27 associated with an advisor. Broker computer 20 may be connected to another computer processor 22 associated with a stock exchange. Although only one plan sponsor 26, custodian 24, payroll provider 25, broker 20, advisor 27, and stock exchange 22 are shown for the sake of simplicity, persons of skill in the art will recognize that more than one plan sponsor, custodian, payroll provider, broker, advisor, and stock exchange may be included in system 10. Computer software, which includes a record keeping system (RKS) as further described herein, may be stored in memory 14 for execution on computer processor 12 to carry out various embodiments of the method of the present invention as further described below.

Some embodiments of the system 10 and method described herein may focus on a participant's retirement goals. In the case of an individual participant investing for retirement through, for example, a 401(k) plan offered by an employer, the system and method may focus on the plan participant's retirement goals, and may assist the plan participant in achieving those goals through a method implemented in computer software. That computer software may be made accessible to a plan participant through a password-protected user interface, such as but not limited to an Internet website. In various embodiments, the present method may provide a participant with investment concepts and principles, answers to frequently asked questions (FAQs) on investing and retirement planning, articles on finances and investments, investment calculators, and asset allocation models.

Figure 2:
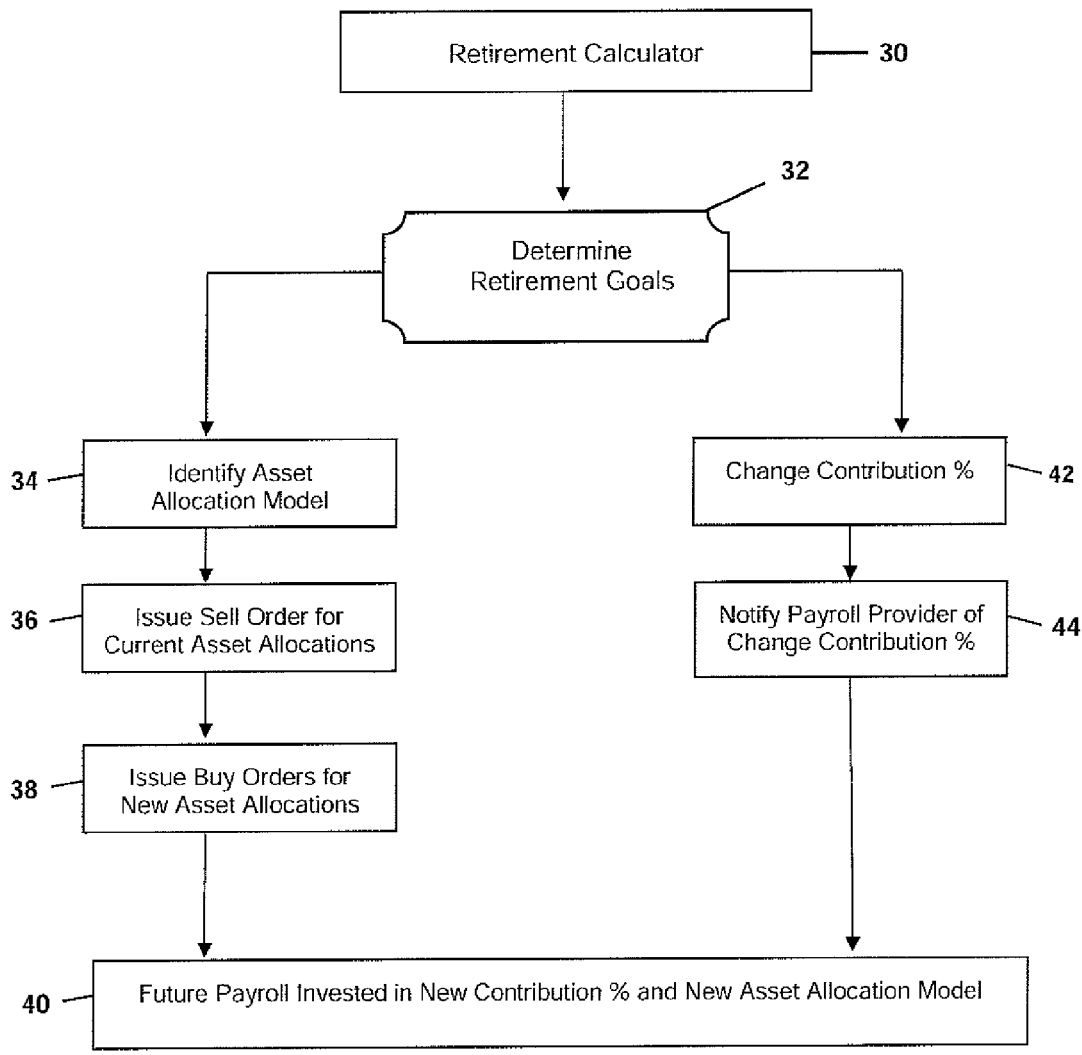
FIG. 2 is a flowchart of a method for managing tax-deferred retirement accounts in accordance with various embodiments of the present invention.

FIG. 2 illustrates a retirement calculator 30 of various embodiments of the computer software a participant may use to determine how much money should be saved each year in order for a participant to establish a retirement fund of sufficient size to pay the participant's living expenses during the retirement years. In some embodiments, a calculator 30 may determine a participant's retirement goals as indicated at 32 and may provide the participant a rate of return and annual contribution to a 401(k) savings account required to achieve those goals. As indicated at 34, a calculator 30 may also identify an asset allocation model 34 appropriate for a participant based on the participant's information, which is further discussed below. In some embodiments, a default asset allocation model may be assigned, with the option that a participant may change his or her asset allocation model, if desired. As shown at 36, system 10 may allow each participant to issue a sell order for current asset allocations and to issue a buy order for new asset allocations as shown at 38. As indicated at 42, a participant may change the contribution percentage of his or her payroll that will be contributed to the retirement plan each pay period. System 10 may notify the participant's payroll provider to change the participant's contribution percentage in accordance with the participant's wishes as illustrated at 44. As indicated at 40, in some embodiments future payroll contributions to the retirement plan are then invested according to the participant's specified contribution percentage and asset allocation model.

As shown in FIG. 3, in various embodiments, a retirement calculator may provide user-entry fields which may be pre-populated or in which a participant may enter data for a series of parameters including his or her current age, a proposed retirement age, an estimated annual inflation rate, a target annual rate of return, an annual income, an estimated annual salary increase percentage, the percentage of current income desired at retirement, the participant's contribution percentage, an employer's matching contribution percentage, if any, the current value of the participant's 401(k) savings account, the value of the participant's other tax-deferred retirement accounts, such as an IRA, and the value of any taxable retirement savings accounts, such as money market accounts. For convenience, the system may provide an on-screen calculator that may be used to calculate any desired quantities.

Historically, inflation has averaged about 3.5% over the course of the 20th century, so a reasonable default value for inflation is about 3%. Factoring in inflation helps estimate future income needs in inflated future dollars. The retirement calculator may compute the percentage of current annual income, which a participant indicated he or she will need by retirement age, adjusted each year for inflation or salary increases, whichever is greater. If the annual salary increases by 5%, for example, the future income need will increase by 5% since 5% is greater than the historical inflation rate of 3%. However, if the annual salary increases by only 2%, for example, the future annual income needed will be computed based upon the historical rate of inflation of 3%. Of course, the percentages indicated herein are exemplary and not limiting to the present invention.

To maintain a participant's desired lifestyle at retirement, the participant may enter the percentage of his or her current income that the participant desires to have at retirement. In some embodiments, in order to calculate retirement funds needed based on the participant's desired income at retirement, the first year of retirement income may be compounded by 3% for inflation and the number of years of retirement based on life expectancy. As reported in the 1997 Replacement Ratio Study conducted by Georgia State University, experts predict that a participant will need approximately 65 to 85 percent of the participant's current income to maintain his or her present lifestyle in retirement. Of course, the needed funds may vary from participant to participant depending on the desired lifestyle, and the percentages used herein are exemplary and not limiting to various embodiments of the present invention.

After retirement begins, although some expenses may drop, such as work related expenses and paying into Social Security and other taxes, other expenses may either stay the same or increase. A participant's basic living expenses typically stay the same; however, health care costs and medical expenses often increase. In the early retirement years, some expenses increase because the participant has new found freedoms with time to travel, rediscover old hobbies, or pick up new ones. During the middle retirement years, some expenses may decrease as the retiree travels less and stays closer to home. In the later years, income needs are often determined by health care costs, as reported by National Underwriter in 1997. Those factors should be taken into account, if possible, as a participant plans for the desired level of income during retirement.

The annual income needed by retirement age may be computed by taking into consideration inflation and salary increases. This resulting figure may then be compounded at 3% (or other suitable percentage) annually for inflation, or by percent of salary increase, whichever is greater, for example, or possibly using both inflation and salary increase. In various embodiments, life expectancy may be estimated using the IRS Unisex Life Expectancy Table from IRS Publication 590 or some other suitable life expectancy data. Unquestionably, people now are living longer, which further complicates retirement planning A study published in the May/June 1999 issue of the Bank Securities Journal estimates that 60% of today's 65 year olds will live to age 85, 12% will reach age 95, and 8% will live to celebrate their 100th birthday. Life expectancies are typically stated as statistical averages, meaning that a given person could live more years or fewer years than the stated life expectancy. Approximately 50 percent of all people die before life expectancy and the other 50 percent live well beyond their life expectancy.

In various embodiments, a participant may enter a contribution percentage and a company match, if any, or those fields may be pre-populated for his or her 401(k) savings plan. A participant may change the contribution percentage. The contribution percentages may be used in determining a participant's annual savings. The annual savings are compounded based on a participant's increase in salary, until retirement age, and are also compounded by the targeted rate of return in order to determine the future value of a participant's 401(k) savings.

Not surprisingly, most participants contribute up to the level of the company match. Generally speaking, this is viewed as a positive result indicating that participants understand the mechanics of the match and appreciate its value. However, according to a Plan Sponsor Exclusive 2003 Recordkeeping Survey, there is evidence which suggests that some participants believe the match is a company-sanctioned benchmark representing either (i) how much they should save or (ii) a cap on the maximum amount they can save. In reality, the Internal Revenue Service (IRS) allows a participant to contribute up to 100% of the person's salary to a 401(k) plan, subject to an annual maximum dollar amount, which is presently $15,500 for the year 2007, for example. Any employer matching contributions will be additional savings above the IRS's annual limit. Additionally, if a 401(k) plan includes a "catch-up" provision for employees age 50 and over, such participants may contribute an additional "catch-up" amount, which is $5,000 for the year 2007, for example.

In various embodiments, a participant may enter the market value of any other tax-deferred and/or taxable accounts which are earmarked for retirement. If the participant has several statements, they may use an online calculator to add the value of the accounts and copy and paste in the appropriate boxes.

The rate of return entered on the data input page may be used for all financial calculations and projections. If a participant enters a rate of return higher than the historical rate of return(s) earned for the applicable asset allocation models during a given period, such as 1973 to 2006, for example, the participant may receive an error message, such as "Rate of Return (ROR) exceeds Historical ROR for asset allocation models. Enter a lower rate of return." For example, during the time period beginning 1973 and ending 2006, earning a rate of return in excess of 14 percent may fall outside the scope of the historical returns for each of the applicable asset allocation models.

As shown in FIG. 4, computer software in some embodiments of the present invention may calculate results based on the participant's input and may display the results. A results page may illustrate the additional annual percentage of income the participant must save in order to establish his or her needed retirement fund. A results page may also identify the name of an asset allocation model that matches a participant's targeted rate of return. If a participant is not taking advantage of an employer's maximum matching contribution, a results page may alert the participant to this fact. If the projected funds are insufficient to meet a participant's goals, a results page may also alert a participant to the fact that he or she is not contributing enough in order to achieve his or her retirement goals and may identify some possible courses of action to remedy that situation, such as targeting a higher rate of return (ROR), saving more, re-evaluating the income needed at retirement, or retiring at a later age.

The results page may also provide more information for a participant to consider if the projections demonstrate a shortage at retirement. To determine if a participant will have a shortage (deficit) in his or her retirement fund by the desired retirement age, the estimated future value of the current retirement portfolio(s) may be subtracted from the estimated retirement fund need. If calculations project a deficit by the time a participant reaches retirement age, the participant may be invited to consider several options, such as:

(a) consider saving in a tax-deferred account by making contributions, such as but not limited to maximum contributions, to a tax-deferred retirement account; e.g., IRA, 401(k) Plan, or Roth IRA;

(b) consider changing the asset allocation model in order to increase the target rate of return on investments;

(c) consider delaying retirement because each year retirement is delayed increases the investment contributions and decreases the retirement withdrawals; and (d) consider reevaluating future income needs with a view toward decreasing the desired amount, if possible.

By the time a participant reaches retirement age, the participant may need a retirement fund from which he or she may pay his or her annual living expenses, through life expectancy. A results page may illustrate an estimated retirement fund needed, in future value, i.e., taking into consideration inflation and years of retirement based on life expectancy. A participant's targeted rate of return may be used to calculate the growth of the savings, for all accounts earmarked for retirement, up to retirement age. Future values may be totaled to illustrate a participant's projected retirement savings needed. If the projections illustrate that a participant will have a deficit at retirement age, the results page may illustrate the dollar amount of the deficit and may illustrate the additional annual contribution percentage a participant will need to make in order to reach his or her retirement goal.

In the embodiment of FIG. 4, a retirement calculator may return information separated into three groups, namely, a savings status and future value chart, a contribution summary, and a list of assumptions used by the retirement calculator in arriving at the savings and future value numbers. The savings status and future value group may be named "Savings Earmarked For Retirement," and may provide a participant with information on the current value of the participant's 401(k) account, the current value of other tax-deferred retirement accounts, the current value of taxable retirement accounts, the future value of retirement savings, the size of the fund calculated as needed for retirement, the shortfall (or excess, as the case may be) of the future value of the retirement fund with respect to the needed fund, the amount that must be set aside annually to make up that shortfall, both as a dollar amount and as a percentage of annual income needed, and identify an appropriate asset allocation model based on the employee's target rate of return.

The contribution summary may be provided under the "Summary" label in FIG. 4 and may inform the participant whether a participant's contribution percentage is sufficient to reach the participant's retirement goals. A contribution summary may also inform a participant of the steps that might be taken to re-evaluate the investment approach, such as targeting a higher rate of return (ROR), saving more money, re-evaluating the income needed at retirement, or retiring at a later age.

In some embodiments, a list of assumptions used by a retirement calculator in arriving at the savings and future value numbers may be provided under the "Assumptions" summary in FIG. 4. In this embodiment, those assumptions include the participant's current age, desired retirement age, life expectancy, years of investing, years of retirement payout, marginal tax rate, contribution election percentage, target annual rate of return, estimated annual rate of inflation, estimated annual salary increase, current annual income, percentage of current income desired at retirement, and calculated annual retirement income need taking into account estimated inflation and salary increases.

In various embodiments, a tax advantage calculator may be provided to allow a participant to determine what tax advantages may be obtained by participating in a tax-deferred retirement account such as a 401(k) plan. FIG. 5 illustrates one embodiment of such a tax advantage calculator. As seen in FIG. 5, data fields may be pre-populated or a participant may enter a value in the annual income amount field, the tax bracket field, the targeted rate of return field, the employee contribution rate (which is preferably a percentage) field, and a field for the matching contribution of the participant's employer, if any. The calculator may use that information to return projected investment performance data to the participant, as in the table illustrated in FIG. 5. Using the information input by the participant, the calculator may multiply the participant's contribution percentage by the annual income to return the employee's total annual contribution to the 401(k) plan. A calculator may also illustrate tax advantages associated with saving that amount through a company's 401(k) plan as compared to saving the same amount in a taxable account, and may provide a comparison of the future value of those accounts. In the table of FIG. 5, for example, the future value of the taxable savings and 401(k) savings are illustrated for 5, 10, 15, 20, and 25 years. Additionally, a calculator may provide a field entry for a participant to enter a desired number of years to determine the respective future values of those accounts in a specified number of years. Using a calculator, then, a participant may be able to change, for example, the rate of return and contribution percentage to determine what impact those variations will have on the future value of the 401(k) and taxable accounts for a given number of years in the future. Thus, a tax advantage calculator of some embodiments of the present invention may demonstrate the tremendous tax advantage that participants may gain by saving for retirement through their employer's 401(k) plan.

Asset Allocation Models: The performance of a portfolio has two primary factors: (i) investment return; and (ii) volatility. A ten-year Brinson Study concluded that 93.6% of investment performance is based on allocation between the asset classes, e.g., cash, stocks, and bonds. The fundamental tenet that asset allocation has the greatest impact on long-term total investment returns has been embraced by large institutions and sophisticated investors, who are increasingly turning to asset-class investing according to methods known in the art. Asset-class investing involves investing and committing to whole markets rather than buying individual securities.

Most plan participants are unlikely to acquire the skills needed to build suitable portfolios like professional fiduciaries of institutional plans. Therefore, in accordance with some embodiments of the present invention, a participant may be defaulted to an asset allocation model designed by the advisor, which the participant may change at any time, if desired. By placing a participant in an asset allocation model, the participant may realize the benefits of the "best practices" presently used by institutional investors instead of being relegated to indiscriminate fund picking, which is thrust upon them by other service providers, whose "solution" is to offer an overabundance of fund choices.

In accordance with some embodiments of the present invention, the advisor designs asset allocation models based on historical returns for each asset class from 1973 to 2006 as reported by Morningstar and Dimensional Fund Advisors. Of course, historical performance does not guarantee future performance and is not limiting to various embodiments of the present invention.

FIG. 6 illustrates a sample moderate asset allocation model.

Portfolio Rebalancing: When an asset in a portfolio performs extraordinarily well or, conversely, performs poorly, its portfolio weighting or percentage will increase or decrease, which in turn will throw the participant's asset allocation model out of alignment. To return the portfolio to its target composition, a participant would have to sell enough of the over-weighted assets and buy enough of the under-weighted assets in order to bring the portfolio back in alignment with the criteria for division between the asset classes for the model.

In order to maintain the relative percentages of the total monetary value allocated to each distinct investment according to each participant's asset allocation model, some embodiments of the present invention may rebalance a participant's portfolio on a regular basis. In some embodiments, a participant's portfolio may be rebalanced, if necessary, each time a participant contributes a predetermined amount of money, such as, but not limited to, through regular contributions. A regular contribution may include but is not limited to a payroll contribution. A regular contribution may be allocated according to which investment or investments have increased or decreased in value, and which may be responsible for a participant's portfolio being out of alignment from the participant's asset allocation model. That is, the contribution is used to buy more of the investments that have become underweighted in selected amounts so as to bring the relative percentage of each investment back into alignment with the asset allocation model. When a portfolio is rebalanced, if necessary, each time a regular contribution is made, the portfolio may substantially maintain the relative percentages of each investment in order to more closely conform to an asset allocation model. Also, in this embodiment, transaction costs are decreased because a buy or sale of assets apart from regular contributions is less likely to be necessary in the future to accomplish rebalancing.

In other embodiments, a participant's portfolio may be rebalanced automatically on a regular basis, such as but not limited to on a quarterly basis, for example. To rebalance a portfolio, a system in accordance with some embodiments of the present invention may sell the investments that have over-performed for the quarter and may buy the investments that have under-performed to bring the portfolio back in alignment with the applicable asset allocation model.

Figure 11:
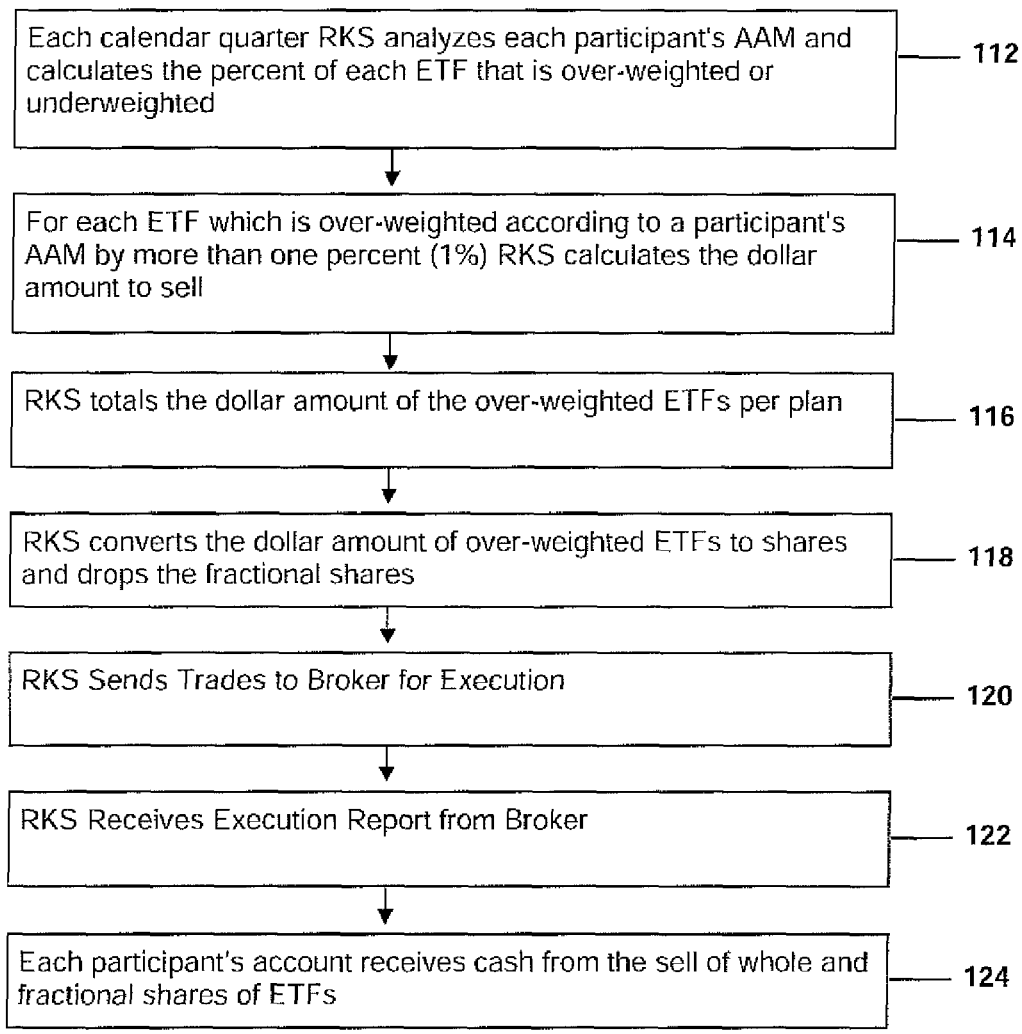
FIG. 11 is a flowchart of a portfolio rebalancing process in accordance with an embodiment of the present invention.
Figure 12:
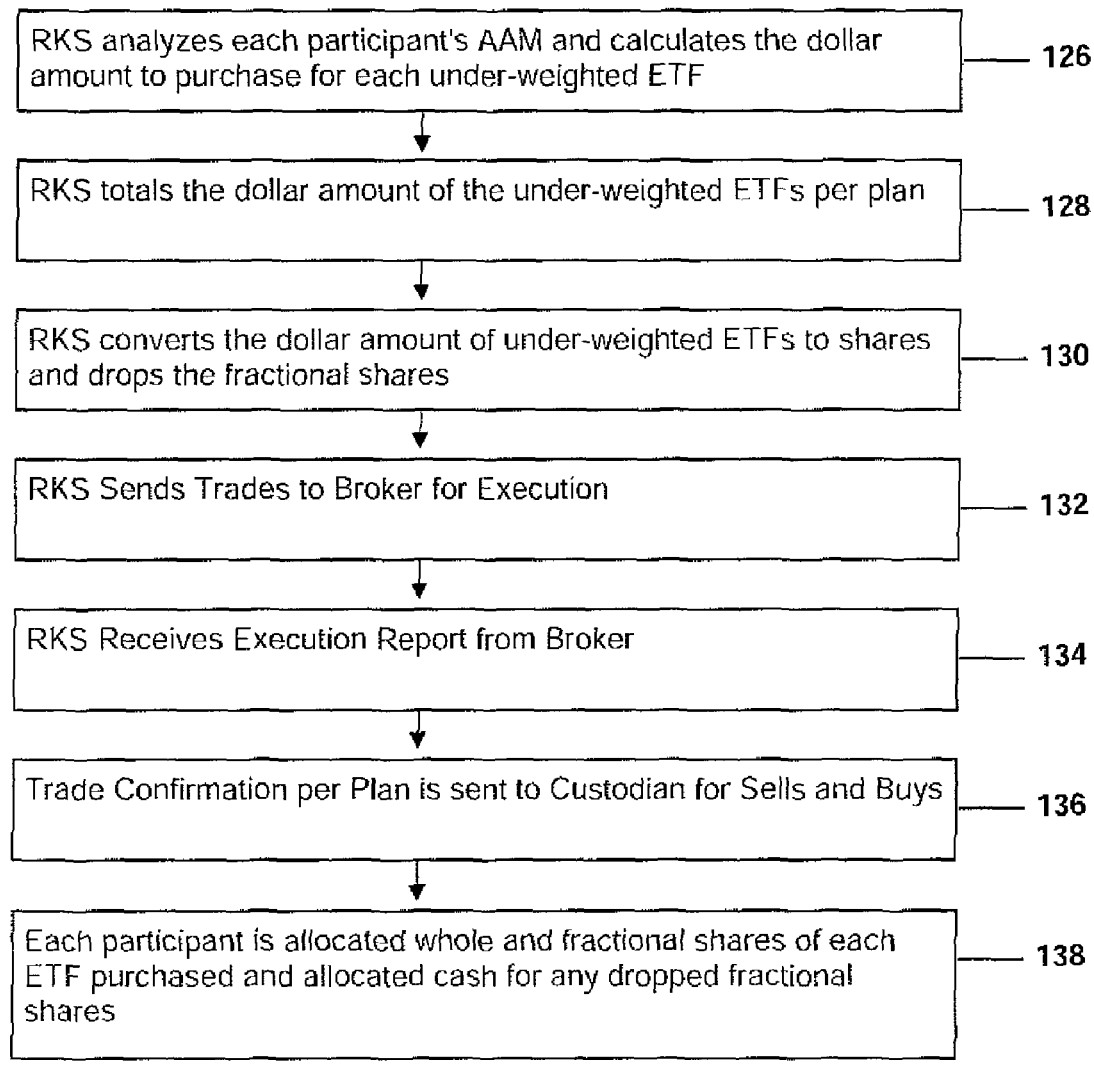
FIG. 12 is a flowchart of a portfolio rebalancing process in accordance with an embodiment of the present invention.

Referring to FIGS. 11 and 12, the record keeping system (RKS) may automatically rebalance each participant's portfolio based on the applicable asset allocation model. As indicated at 112, each calendar quarter, for example, or on another suitable periodic basis, the RKS may analyze each participant's AAM and calculate the percentage of each ETF that is over-weighted or under-weighted, then for each ETF which is over-weighted by more than a certain amount, such as one percent (1%), for example, the RKS may calculate the dollar amount to sell as indicated at 114. Of course, any desired criterion for the amount of over-weighting that may trigger such action may be used. Next, the system may total the dollar amount of the over-weighted ETFs by plan as indicated at 116, then the RKS may convert the dollar amount of over-weighted ETFs to shares and drop any fractional shares as indicated at 118. Then a sell order may be sent to the broker to sell all whole shares as indicated at 120. After the sell is executed, the broker may send a report to RKS for the executed trade price, shares sold, and dollar amount for each ETF sold as indicated at 122. Each participant's account may receive cash from the sale of whole and fractional shares of ETFs as indicated at 124. Then the RKS may analyze each participant's AAM and calculate the dollar amount to purchase for each under-weighted ETF as indicated at 126, then the RKS may total the dollar amount of the under-weighted ETFs by plan as indicated at 128, and the RKS may convert the dollar amount of under-weighted ETFs to shares and drop any fractional shares as indicated at 130. The RKS may send the desired trades to the broker for execution as indicated at 132, and after the buys are received and executed by the broker, the broker may send a report to the RKS for the executed trade price and shares purchased for each ETF, as indicated at 134. The RKS may then send a confirmation report by plan to the custodian as indicated at 136. Participants may be allocated whole and fractional shares of each ETF purchased and, for any dropped fractional shares, participants may be allocated cash as indicated at 138. In this manner, each participant's account may be substantially rebalanced in accordance with the appropriate asset allocation model.

Figure 7:
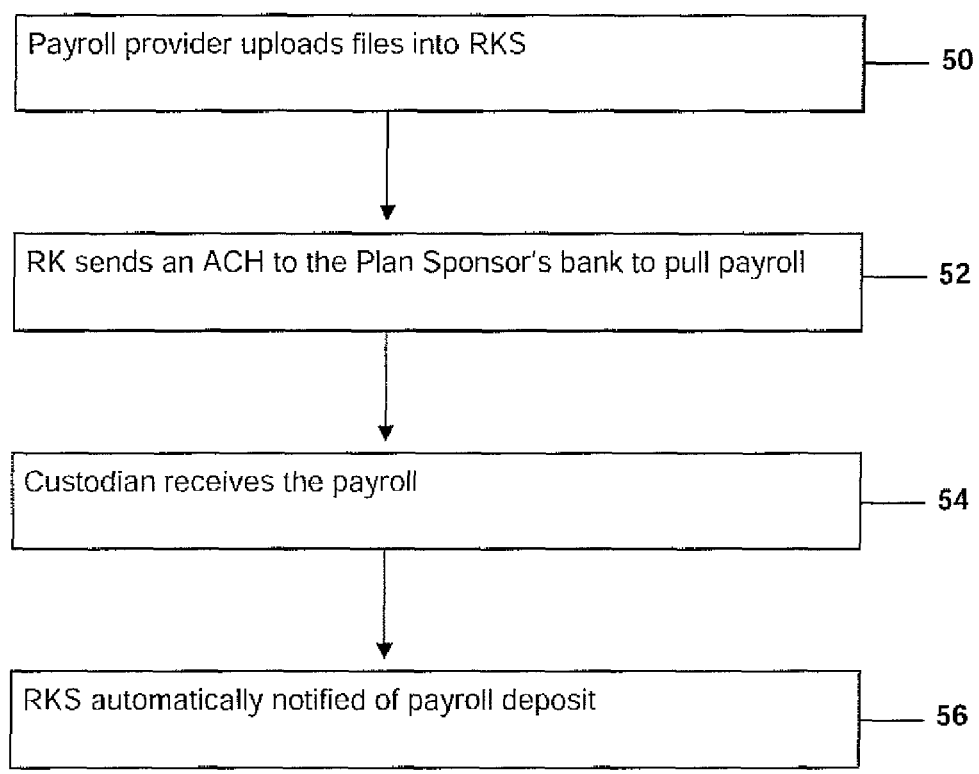
FIG. 7 is a flowchart of a payroll deposit process in accordance with an embodiment of the present invention.

ETF Trading Process and Rebalancing: Referring to FIG. 7, in various embodiments the payroll provider may upload payroll files in the RKS as indicated at 50. Each company's payroll files may contain each participant's deferral regular contribution identified by the source, e.g., employee pretax, employer match, catch up, loan payment, and/or profit sharing contribution. The RKS may then send an Automated Clearing House (ACH) request to the plan sponsor's bank to pull payroll as indicated at 52. Next, the custodian may receive the payroll contributions as indicated at 54, and the RKS may be automatically notified of the payroll deposit as indicated at 56.

Figure 8:
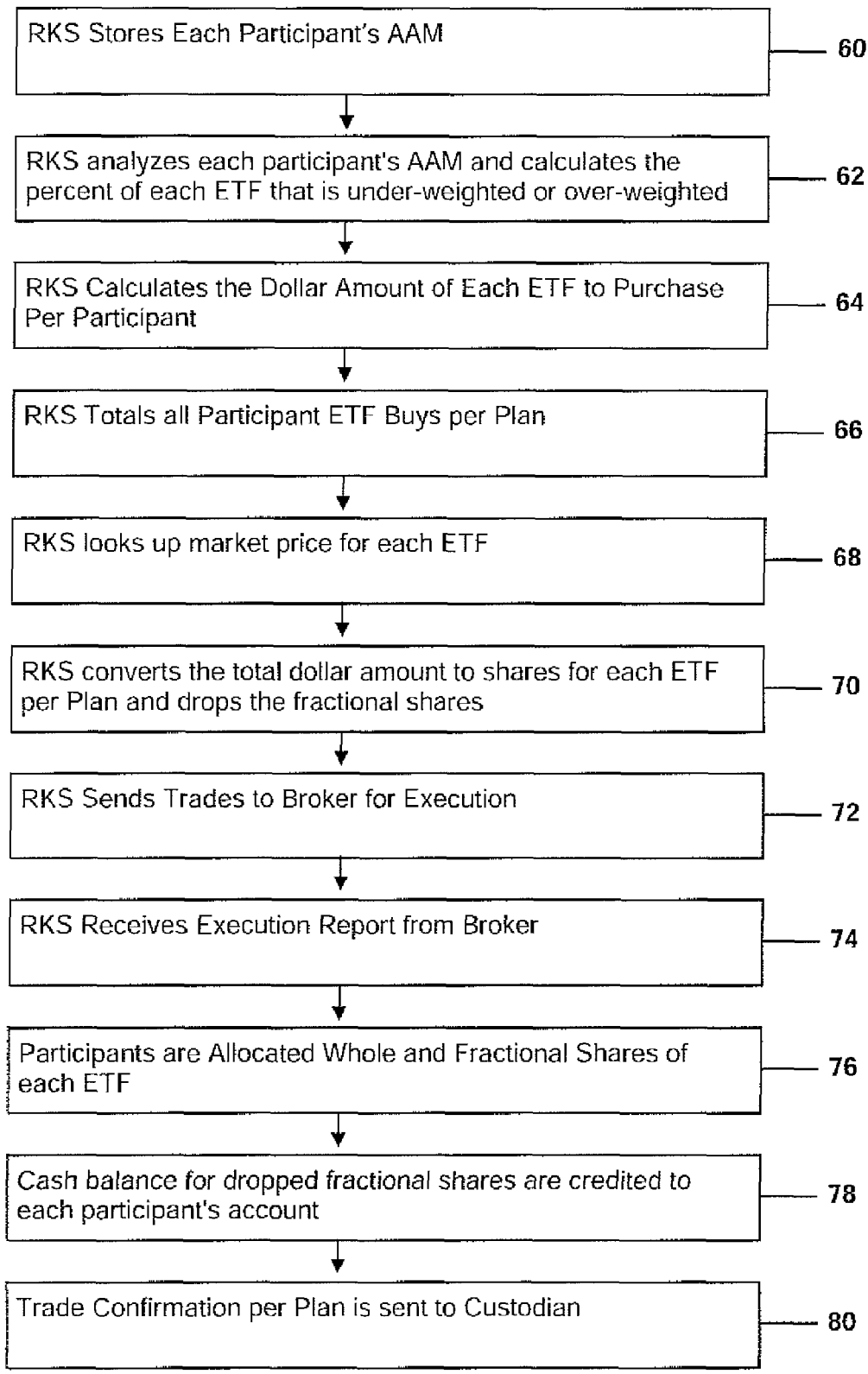
FIG. 8 is a flowchart of a payroll contribution process in accordance with an embodiment of the present invention.

In an alternative embodiment shown in FIG. 8, the RKS may store each participant's AAM in memory as indicated at 60, which determines which ETFs are to be purchased for each participant. Based on that information, the RKS computer software may analyze each participant's AAM and calculate the percentage of each ETF that is under-weighted or over-weighted as indicated at 62, then the RKS may compute the dollar amount of each ETF to purchase per participant as indicated at 64, then the RKS may total all participant ETF buys per plan as indicated at 66, then the RKS may look up a market price for each ETF as indicated at 68, then the RKS may convert the total dollar amount to shares for each ETF per plan and drop any fractional shares as indicated at 70. Next, the RKS computer software may send a buy order to a broker for all the appropriate ETFs as indicated at 72. The RKS may automatically receive an execution report from the broker as indicated at 74, and a confirmation message may be sent to the custodian as indicated at 80. Participants may be allocated whole and fractional shares of each ETF as indicated at 76. Further, the cash balances for dropped fractional shares may be credited to each participant's account as indicated at 78.

In accordance with various embodiments of the present invention, trading ETFs in a 401(k) or other tax-deferred plan allows the participants to reap the benefits of ETFs without incurring high brokerage commissions. This method significantly lowers the overall costs for participants; for example, costs may be reduced from 30 to 160 basis points or more over retail mutual funds.

John Bogle explained the logic of lower costs in his paper, *The First Index Mutual Fund: A History of Vanguard Index Trust and the Vanguard Strategy*. In the academic world, the *Index Thesis* demonstrates that all investors, as a group, are the market. Since all investors are the market, there is no way they can outpace the market. However, that fact holds true only before the cost of investing is considered. After investment costs are considered, the returns of all investors inevitably lag the market by the amount of the cost.

The inclusion of ETFs, which generally cover all of the major indices, also provides some embodiments of the present invention more latitude in designing asset allocation models. This latitude allows some embodiments of the present invention the ability to offer participants well-structured, diversified asset allocation models; e.g., preservation, conservative, moderate, growth and aggressive.

Figure 9:
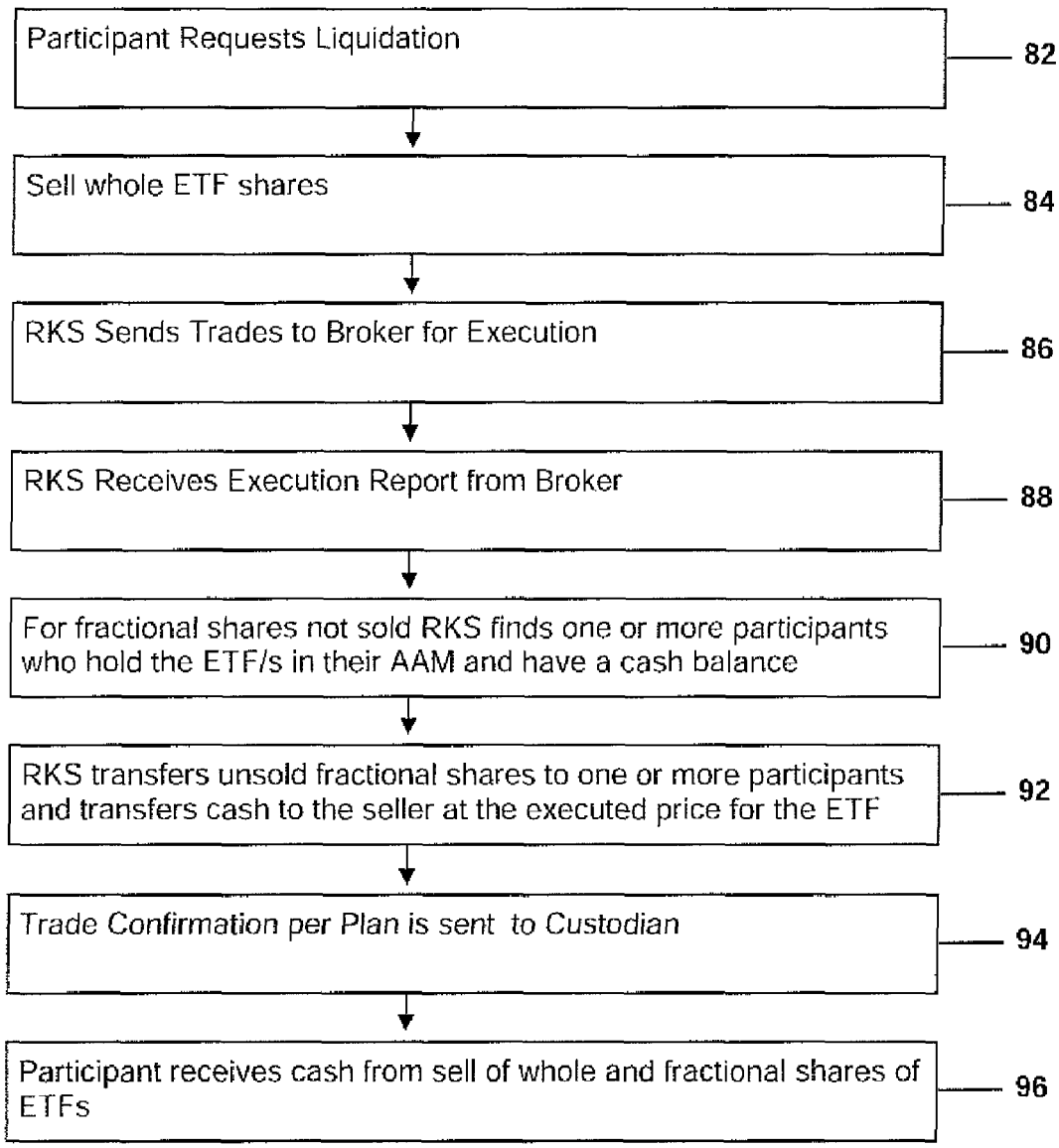
FIG. 9 is a flowchart of a participant termination process in accordance with an embodiment of the present invention.

Participant Termination. Referring to FIG. 9, when a participant terminates employment, such a participant usually requests to withdraw his or her account balance from his or her 401(k) account as indicated at 82. Such a withdrawal request may be made online. Based on the withdrawal request, a pending transaction may be created to sell all shares of ETFs in a participant's account as indicated at 84, and an order may be sent to a broker to sell whole shares of ETFs as indicated at 86. After a sale is executed, a broker may send a report to the RKS reflecting the executed trade price, the number of shares sold, and the dollar amount received at the custodian for each ETF sold as indicated at 88. For fractional shares not sold, the RKS may find one or more other participants who hold the relevant ETFs in their portfolio and have a cash balance. The RKS may transfer the unsold fractional shares to such one or more other participants who hold the relevant ETFs and transfer cash to the seller at the executed price for the ETFs as indicated at 92. A confirmation may be sent to the custodian as indicated at 94. Finally, the terminated participant may receive the proceeds from the sale of the appropriate whole shares and fractional shares as indicated at 96.

Figure 10:
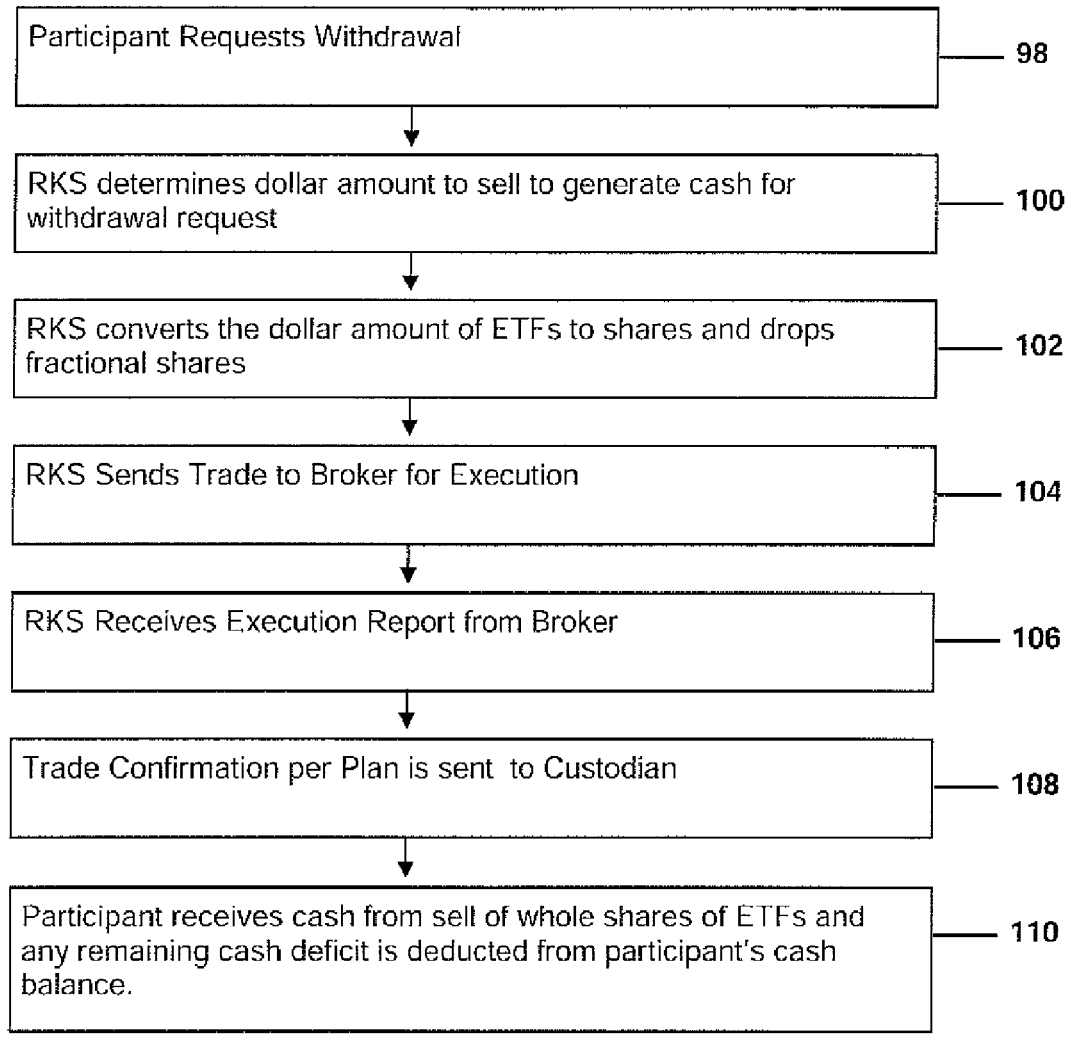
FIG. 10 is a flowchart of a participant withdrawal process in accordance with an embodiment of the present invention.

Participant Withdrawal. As shown in FIG. 10, a participant may request a withdrawal from his or her portfolio for various reasons, including but not limited to a loan, a hardship, or retirement income. Such a withdrawal request may be made online as indicated at 98, whereupon a pending transaction may be created to sell a dollar amount of ETF shares equal to the withdrawal requested as indicated at 100. As indicated at 102, the RKS may convert the dollar amount of ETFs to shares and drop any fractional shares, and a sell order may be sent to the broker to sell whole shares as indicated at 104. After the sell is executed, the broker may send a report to the RKS reflecting the executed trade price, the number of shares sold, and the dollar amount received at the custodian for each ETF sold as indicated at 106. The RKS may send a confirmation report by plan to the custodian as indicated at 108. Finally, the participant may receive the proceeds from the sale of whole shares, and any remaining cash deficit may be deducted from the participant's cash balance as indicated at 110.

Figure 13:
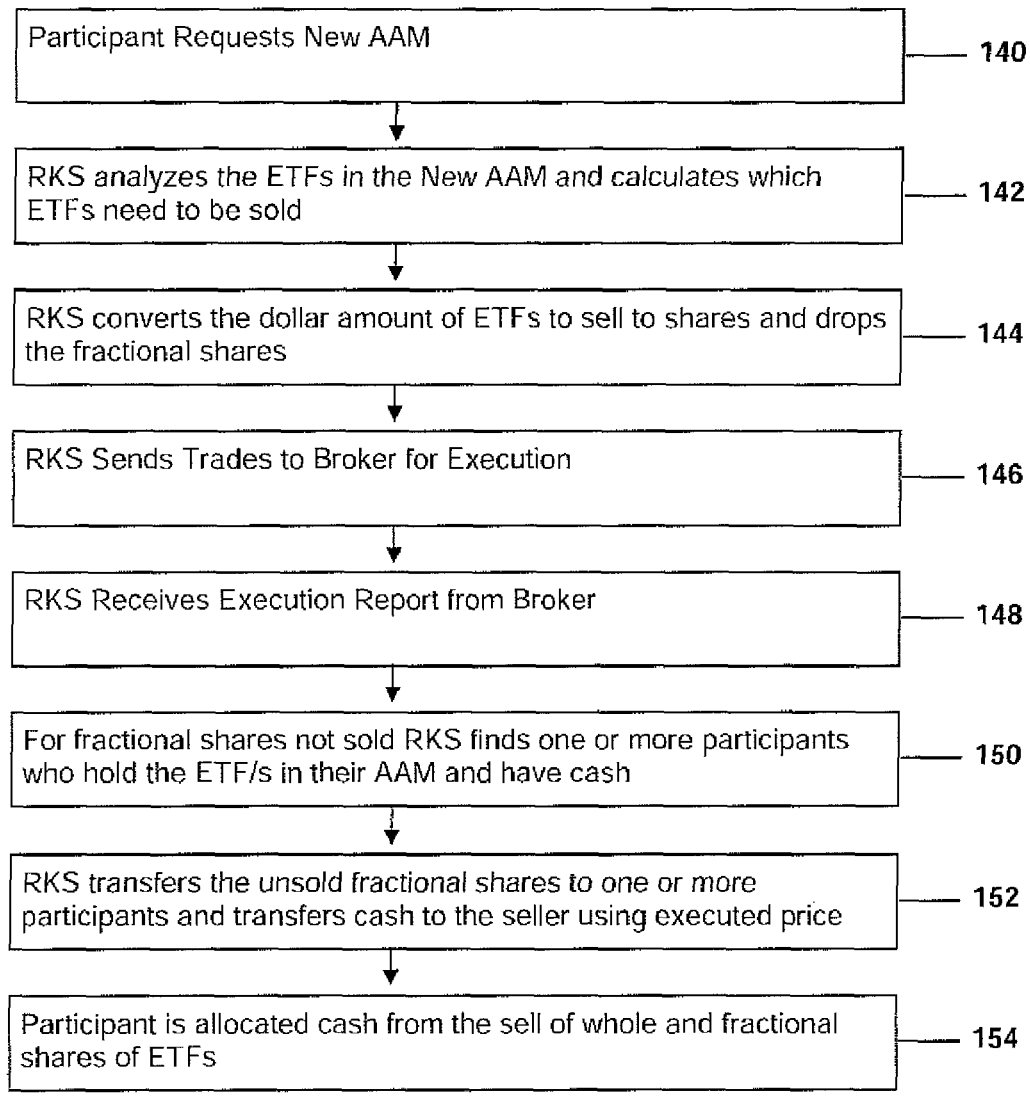
FIG. 13 is a flowchart of an asset reallocation process in accordance with an embodiment of the present invention.
Figure 14:
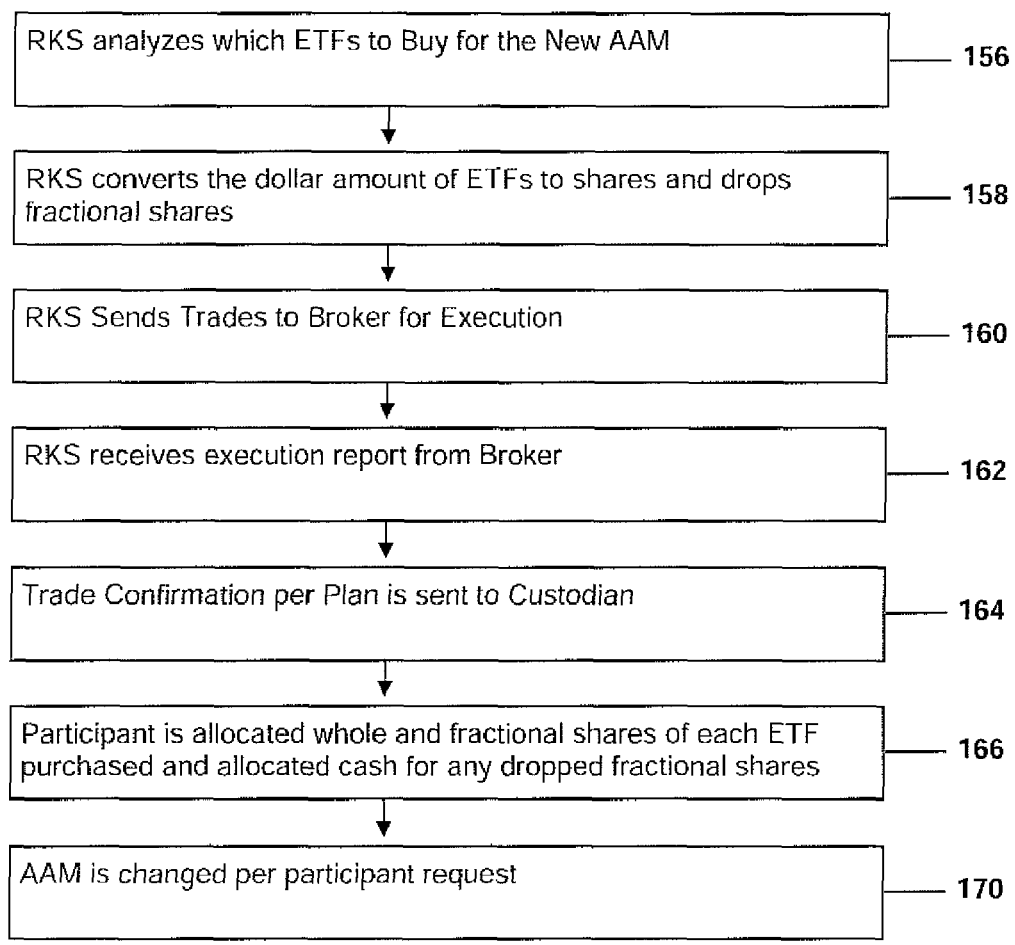
FIG. 14 is a flowchart of an asset reallocation process in accordance with an embodiment of the present invention.

Participant Requested Change of Model: Referring to FIG. 13 and FIG. 14, in some embodiments a participant may request a change in his or her AAM as indicated at 140. Again, such a request may be made online. In response to such a request, the RKS may analyze the ETFs in the new AAM and calculate which ETFs need to be sold as indicated at 142. Then the RKS may convert the dollar amount of ETFs to sell to shares and drop the fractional shares as indicated at 144. A sale order may be sent to the broker to sell whole shares as indicated at 146. After the sale is executed, the broker may send a report to the RKS reflecting the executed trade price, the number of shares sold, and the dollar amount received for each ETF sold as indicated at 148. For fractional shares not sold, the RKS may find one or more other participants who hold the relevant ETFs in their portfolio and have cash as indicated at 150. Then the RKS may transfer the unsold fractional shares to such one or more other participants and transfer cash to the seller using the executed price as indicated at 152. The participant's account may be allocated cash from the sale of whole and fractional shares of ETFs as indicated at 154. Transactions for buys may be generated to purchase other ETFs for a participant based on a participant's new AAM as indicated at 156, and the RKS may convert the dollar amount of ETFs to shares and drop any fractional shares as indicated at 158, and corresponding buy orders may be sent to the broker to buy whole shares as indicated at 160. After the buys are executed, a broker may send a report to the RKS reflecting the executed trade price and the number of shares purchased for each ETF as indicated at 162, and the RKS may send a confirmation report by plan to the custodian as indicated at 164. The Participant may be allocated whole and fractional shares of each ETF purchased and, for any dropped fractional shares, the participant may be allocated cash as indicated at 166, and the AAM may be changed per the participant's request as indicated at 170.

Persons skilled in the art will appreciate that various embodiments described herein provide at least the following benefits: diversified investment options, including ETFs, which cover all the major indices; reduced management fees; well-structured asset allocation models; financial tools to enable a participant to accurately determine his or her retirement needs and choose an asset allocation model which will assist the participant in actually reaching his or her retirement goals; and the availability of sufficient investment information so that a participant of any sophistication may make his or her own well-informed investment decisions.

The combination of these benefits increases the chances that a participant will retire with an adequate retirement fund. To put these benefits in perspective, one must keep in mind that fees and performance returns have a direct relationship, i.e., investment fees reduce the returns of each fund by the amount of the investment fees. For example, by reducing participants' fees by 97 basis points annually, an average participant with a $50,000 balance and an annual contribution of $12,000 per year will have $120,435 more in their retirement portfolio in 20 years, $243,321 more in 25 years, and $463,647 more in 30 years.

According to a *Public Agenda Study*, forty-six percent of Americans have saved less than $10,000 for retirement, only twenty-nine percent of pre-retirees (the 51 to 61 age group) have saved $100,000 or more and only nineteen percent of our work force save each time they receive a paycheck. Instead of guessing how much money the participant will need by retirement age, various embodiments of the present invention may allow a participant to perform "what if" scenarios in order to accurately determine the amount of money they will need in retirement. In this way, a participant may use the tools of various embodiments of the present invention to illustrate whether the participant needs to contribute more to his or her retirement fund in order to reach his or her goal.

Some embodiments of the present invention are a means for a 401(k) service provider to offer ETFs as investment options in 401(k) plans without requiring each participant to either establish a self-directed brokerage account or invest in ETFs by purchasing units of a "collective trust." Some embodiments of the present invention offer investment in ETFs without prohibitive costs by allowing an RKS to trade directly with a broker, per plan, and receive institutional pricing, which may result in trading costs as low as a penny per share, for example.

Although the foregoing specific details describe certain embodiments of this invention, persons reasonably skilled in the art will recognize that various changes may be made in the details of this invention without departing from the spirit and scope of the invention as defined in the appended claims and considering the doctrine of equivalents. Therefore, it should be understood that this invention is not to be limited to the specific details shown and described herein.

What is claimed is:

1. A non-transitory computer readable medium comprising instructions executable by a computer processor for managing a plurality of tax-deferred retirement accounts for a plurality of participants in a plurality of tax-deferred retirement plans, said instructions being configured to cause said computer processor to perform the following steps:

calculating an estimate of retirement savings based on a plurality of parameters selectable by said plurality of participants;

for each of said plurality of participants, investing in a portfolio comprising a plurality of exchange traded funds according to an asset allocation model, said portfolio becoming out of alignment with said asset allocation model over time; and selectively buying into at least one underweighted exchange traded fund using at least one regular contribution so as to cause said portfolio to more closely conform to said asset allocation model.

2. The computer readable medium of claim 1 wherein said plurality of tax-deferred retirement plans comprises at least one of 401(k), 403(b), 457, and 409A employer sponsored plans.

3. The computer readable medium of claim 1 wherein said computer readable medium further comprises instructions executable by said computer processor for conducting calculations illustrating tax advantages of saving in said plurality of tax-deferred retirement accounts versus saving in a taxable account.

4. The computer readable medium of claim 1 wherein said asset allocation model is set by default.

5. The computer readable medium of claim 1 wherein said asset allocation model is selectable by each of said plurality of participants.

6. The computer readable medium of claim 1 wherein said computer readable medium further comprises instructions executable by said computer processor for selling at least a portion of at least one over-weighted exchange traded fund in coordination with said at least one regular contribution so as to cause said portfolio to more closely conform to said asset allocation model.

7. The computer readable medium of claim 1 wherein said plurality of parameters is selected from the group consisting of current age, proposed retirement age, estimated annual inflation rate, target annual rate of return, annual income, estimated annual salary increase percentage, percentage of current income desired at retirement, participant contribution percentage, employer matching contribution percentage, current value of retirement savings account, current value of other tax-deferred retirement accounts, and current value of any taxable retirement savings accounts.

8. A non-transitory computer readable medium comprising instructions executable by a computer processor for managing a plurality of tax-deferred retirement accounts for a plurality of participants in a plurality of tax-deferred retirement plans, said instructions being configured to cause said computer processor to perform the following steps:

calculating an estimate of retirement savings based on a plurality of parameters selectable by said plurality of participants;

for each of said plurality of participants, investing in a portfolio comprising a plurality of exchange traded funds according to an asset allocation model, said portfolio becoming out of alignment with said asset allocation model over time; and selectively selling an overweighted exchange traded fund if said overweighted exchange traded fund is overweighted by more than a certain amount and selectively buying into an underweighted exchange traded fund, using a regular contribution, so as to cause said portfolio to more closely conform to said asset allocation model.

9. The computer readable medium of claim 8 wherein said plurality of tax-deferred retirement plans comprises at least one of 401(k), 403(b), 457, and 409A employer sponsored plans.

10. The computer readable medium of claim 8 wherein said computer readable medium further comprises instructions executable by said computer processor for conducting calculations illustrating tax advantages of saving in said plurality of tax-deferred retirement accounts versus saving in a taxable account.

11. The computer readable medium of claim 8 wherein said asset allocation model is set by default.

12. The computer readable medium of claim 8 wherein said asset allocation model is selectable by each of said plurality of participants.

13. The computer readable medium of claim 8 wherein said computer readable medium further comprises instructions executable by said computer processor for, in response to a withdrawal request made by a first participant, selling whole shares of at least one of said plurality of exchange traded funds held by said first participant, identifying any unsold fractional shares of said at least one of said plurality of exchange traded funds held by said first participant, identifying a second participant who holds said at least one of said plurality of exchange traded funds and sufficient cash to cover said fractional shares, allocating said fractional shares to said second participant, and allocating said cash to said first participant.

14. The computer readable medium of claim 8 wherein said plurality of parameters is selected from the group consisting of current age, proposed retirement age, estimated annual inflation rate, target annual rate of return, annual income, estimated annual salary increase percentage, percentage of current income desired at retirement, participant contribution percentage, employer matching contribution percentage, current value of retirement savings account, current value of other tax-deferred retirement accounts, and current value of any taxable retirement savings accounts.

15. A method of managing tax-deferred retirement accounts for a plurality of participants in a plurality of tax-deferred retirement plans, comprising:
for each of said plurality of participants, investing in a portfolio comprising a plurality of exchange traded funds according to an asset allocation model, said portfolio becoming out of alignment with said asset allocation model over time; and
selectively buying into at least one underweighted exchange traded fund using at least one regular contribution so as to cause said portfolio to more closely conform to said asset allocation model;
wherein said method is performed by a computer.

16. The method of claim 15 wherein said plurality of tax-deferred retirement plans comprises at least one of 401(k), 403(b), 457, and 409A employer sponsored plans.

17. The method of claim 15 further comprising:
for each of said plurality of participants, conducting calculations illustrating tax advantages of saving in said plurality of tax-deferred retirement accounts versus saving in a taxable account.

18. The method of claim 15 wherein said asset allocation model is set by default.

19. The method of claim 15 wherein said asset allocation model is selectable by each of said plurality of participants.

20. The method of claim 15 wherein each of said plurality of exchange traded funds is purchased.

21. The method of claim 15 further comprising allowing said plurality of participants to conduct calculations of estimated retirement savings based on a plurality of parameters selectable by said plurality of participants, wherein said plurality of parameters is selected from the group consisting of current age, proposed retirement age, estimated annual inflation rate, target annual rate of return, annual income, estimated annual salary increase percentage, percentage of current income desired at retirement, participant contribution percentage, employer matching contribution percentage, current value of retirement savings account, current value of other tax-deferred retirement savings accounts, and current value of any taxable retirement savings accounts.

22. A method of managing tax-deferred retirement accounts for a plurality of participants in a plurality of tax-deferred retirement plans, comprising:
for each of said plurality of participants, investing in a portfolio comprising a plurality of exchange traded funds according to an asset allocation model, said portfolio becoming out of alignment with said asset allocation model over time; and
automatically selling an overweighted exchange traded fund if said exchange traded fund is overweighted by more than a certain amount and automatically buying into an underweighted exchange traded fund, wherein said selling and said buying are performed during at least one regular period, using a regular contribution, so as to cause said portfolio to more closely conform to said asset allocation model;
wherein said method is performed by a computer.

23. The method of claim 22 wherein said plurality of tax-deferred retirement plans comprises at least one of 401(k), 403(b), 457, and 409A employer sponsored plans.

24. The method of claim 22 further comprising:
for each of said plurality of participants, conducting calculations illustrating tax advantages of saving in said plurality of tax-deferred retirement accounts versus saving in a taxable account.

25. The method of claim 22 wherein said asset allocation model is set by default.

26. The method of claim 22 wherein said asset allocation model is selectable by each of said plurality of participants.

27. The method of claim 22 wherein each of said plurality of exchange traded funds is purchased.

28. The method of claim 22 further comprising allowing said plurality of participants to conduct calculations of estimated retirement savings based on a plurality of parameters selectable by said plurality of participants, wherein said plurality of parameters is selected from the group consisting of current age, proposed retirement age, estimated annual inflation rate, target annual rate of return, annual income, estimated annual salary increase percentage, percentage of current income desired at retirement, participant contribution percentage, employer matching contribution percentage, current value of retirement savings account, current value of other tax-deferred retirement savings accounts, and current value of any taxable retirement savings accounts.

29. The method of claim 22 further comprising, in response to a withdrawal request made by a first participant, selling whole shares of at least one of said plurality of exchange traded funds held by said first participant, identifying fractional shares of said at least one of said plurality of exchange traded funds held by said first participant, identifying a second participant who holds said at least one of said plurality of exchange traded funds and sufficient cash to cover said fractional shares, allocating said fractional shares to said second participant, and allocating said cash to said first participant.

30. A non-transitory computer readable medium comprising instructions executable by a computer processor for managing a plurality of tax-deferred retirement accounts for a plurality of participants in a plurality of tax-deferred retirement plans, said instructions comprising:
for each of said plurality of participants, investing in a portfolio comprising a plurality of exchange traded funds according to an asset allocation model, said portfolio becoming out of alignment with said asset allocation model over time;

wherein whole shares and fractional shares of said plurality of exchange traded funds are allocated to each of said plurality of participants;

for each participant of said plurality of participants having at least one of said plurality of exchange traded funds that is underweighted with respect to said participant's asset allocation model by a certain amount (each such participant being hereafter referred to as an affected participant, and each such participant's plan being hereafter referred to as an affected plan), selectively buying into said at least one underweighted exchange traded fund using a regular contribution so as to cause said participant's portfolio to more closely conform to said participant's asset allocation model;

wherein said buying comprises:

computing a dollar amount based on a market price for said at least one underweighted exchange traded fund to be purchased for each affected participant;

computing a total of said dollar amounts for each affected plan;

converting said total to a number of shares based on said market price of said at least one underweighted exchange traded fund for each affected plan and dropping any fractional shares to determine an appropriate whole number of shares of said at least one underweighted exchange traded fund to be purchased for each affected plan;

purchasing said whole number of shares of said at least one underweighted exchange traded fund for each affected plan;

allocating a proportionate amount of said whole number of shares in each affected plan to each affected participant based on each affected participant's investment in said at least one underweighted exchange traded fund, said proportionate amount comprising whole shares and fractional shares of said at least one underweighted exchange traded fund; and crediting each affected participant's account with a cash balance for any dropped fractional shares of said at least one underweighted exchange traded fund.

* * * * *